US010043354B2

(12) United States Patent
Mirov et al.

(10) Patent No.: US 10,043,354 B2
(45) Date of Patent: *Aug. 7, 2018

(54) MULTIPURPOSE CONTACTS FOR DELIVERING ELECTRO-HAPTIC FEEDBACK TO A WEARER

(71) Applicant: Verily Life Sciences LLC, Mountain View, CA (US)

(72) Inventors: Russell Norman Mirov, Los Altos, CA (US); John Lapetina, Los Altos Hills, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/801,188

(22) Filed: Nov. 1, 2017

(65) Prior Publication Data

US 2018/0075716 A1 Mar. 15, 2018

Related U.S. Application Data

(63) Continuation of application No. 14/304,005, filed on Jun. 13, 2014, now Pat. No. 9,830,781.

(51) Int. Cl.

*H04B 3/36* (2006.01)
*G08B 6/00* (2006.01)
*G08B 25/01* (2006.01)

(52) U.S. Cl.

CPC ............. *G08B 6/00* (2013.01); *G08B 25/016* (2013.01)

(58) Field of Classification Search

None

See application file for complete search history.

(56) References Cited

U.S. PATENT DOCUMENTS 5,533,520 A * 7/1996 Inguaggiato ....... A61N 1/36542 200/185
2007/0208232 A1* 9/2007 Kovacs .............. A61B 5/02055 600/300

(Continued)

FOREIGN PATENT DOCUMENTS

KR 10-2013-0130819 A 12/2013
WO 2013074395 A1 5/2013
WO 2014063160 A1 4/2014

OTHER PUBLICATIONS

International Search Report and Written Opinion of International Application No. PCT/US2015/032874 dated Aug. 19, 2015.

*Primary Examiner* — Julie Lieu

(74) *Attorney, Agent, or Firm* — McDonnell Boehnen Hulbert & Berghoff LLP

(57) ABSTRACT

Wearable devices are described herein including a housing and a mount configured to mount the housing to an external surface of a wearer. The wearable devices further include first and second electrical contacts protruding from the housing and configured such that the electrical contacts can be used to measure a Galvanic skin resistance of skin proximate to the electrical contacts when the wearable device is mounted to the external surface of the wearer. The electrical contacts are additionally configured to deliver an electro-haptic stimulus to skin proximate to the electrical contacts when the wearable device is mounted to the external surface of the wearer. Electro-haptic stimulus could be delivered to a wearer to indicate information to the wearer, including information about a health or activity state of the wearer, about communications received by the wearable device, and about alerts generated by the wearable device.

20 Claims, 11 Drawing Sheets

(56) References Cited

U.S. PATENT DOCUMENTS

| | | | | |
|---|---|---|---|---|
| 2007/0208262 | A1* | 9/2007 | Kovacs | A61B 5/0404 600/509 |
| 2010/0191077 | A1* | 7/2010 | O'Kane | A61B 5/015 600/306 |
| 2010/0268056 | A1 | 10/2010 | Picard et al. | |
| 2010/0304864 | A1* | 12/2010 | Johnson | A61B 5/0402 463/36 |
| 2010/0305416 | A1 | 12/2010 | Bedard et al. | |
| 2012/0290215 | A1* | 11/2012 | Adler | G06F 19/3431 702/19 |
| 2013/0296823 | A1* | 11/2013 | Melker | A61M 5/142 604/503 |
| 2014/0031704 | A1* | 1/2014 | De Vries | A61B 5/0533 600/485 |
| 2014/0055352 | A1 | 2/2014 | Davis et al. | |
| 2014/0070957 | A1* | 3/2014 | Longinotti-Buitoni | A61B 5/02055 340/870.01 |
| 2014/0085077 | A1* | 3/2014 | Luna | G08B 6/00 340/539.11 |
| 2014/0135631 | A1 | 5/2014 | Brumback et al. | |
| 2014/0160031 | A1* | 6/2014 | Schie | H02M 1/44 345/173 |
| 2014/0196131 | A1* | 7/2014 | Lee | G06F 21/35 726/7 |
| 2014/0276123 | A1* | 9/2014 | Yang | A61B 5/7275 600/483 |
| 2014/0288401 | A1* | 9/2014 | Ouwerkerk | A61B 5/0533 600/345 |
| 2015/0040282 | A1* | 2/2015 | Longinotti-Buitoni | A61B 5/6804 2/69 |
| 2015/0141784 | A1* | 5/2015 | Morun | G06F 3/015 600/372 |
| 2015/0216479 | A1* | 8/2015 | Abreu | A61B 5/01 340/539.12 |
| 2015/0309535 | A1* | 10/2015 | Connor | G06F 1/163 361/679.03 |
| 2015/0317885 | A1* | 11/2015 | Ramstein | G08B 6/00 340/407.1 |
| 2015/0320588 | A1* | 11/2015 | Connor | A61F 7/0097 607/107 |
| 2015/0335277 | A1* | 11/2015 | Maarek | A61B 5/4041 600/307 |
| 2016/0039424 | A1* | 2/2016 | Hong | B60W 40/08 701/2 |
| 2016/0195928 | A1* | 7/2016 | Wagner | G06F 3/016 345/156 |
| 2016/0287107 | A1* | 10/2016 | Szabados | A61B 5/7214 |

* cited by examiner

MULTIPURPOSE CONTACTS FOR DELIVERING ELECTRO-HAPTIC FEEDBACK TO A WEARER

REFERENCE TO RELATED APPLICATION

This disclosure is a continuation of U.S. patent application Ser. No. 14/304,005 filed on Jun. 13, 2014, which is incorporated herein by reference in its entirety.

BACKGROUND

Unless otherwise indicated herein, the materials described in this section are not prior art to the claims in this application and are not admitted to be prior art by inclusion in this section.

The Galvanic skin response is a change in the conductivity and/or electrical potential of the skin due to changes in the moisture level of the skin. This change in moisture level can be caused by activation or inactivation of sweat glands in the skin. The Galvanic skin response includes the Galvanic skin resistance (GSR), a measure of the conductivity of the skin between two or more points, and the Galvanic skin potential (GSP), a measure of the voltage difference between two or more points on the skin.

SUMMARY

Some embodiments of the present disclosure provide a wearable device, including: (i) a housing; (ii) a mount configured to mount the housing to an external body surface; (iii) first and second electrical contacts protruding from the housing, wherein the first and second electrical contacts are configured to contact skin at the external body surface when the housing is mounted on the external body surface such that a Galvanic skin resistance (GSR) of the skin at the external body surface can be measured between the first and second electrical contacts and such that an electro-haptic stimulus can be delivered to the skin at the external body surface using the first and second electrical contacts; and (iv) electronics disposed in the wearable device, wherein the electronics comprises: (a) a GSR sensor electronically coupled to the first and second electrical contacts and configured to obtain a measurement relating to the GSR of the skin at the external body surface; and (b) an electro-haptic stimulator electronically coupled to the first and second electrical contacts and configured to deliver an electro-haptic stimulus to the skin at the external body surface.

Some embodiments of the present disclosure present a method including: (i) mounting a wearable device to an external body surface, wherein the wearable device comprises: (a) a housing, (b) a mount configured to mount the housing to an external body surface, (c) first and second electrical contacts protruding from the housing, (d) a GSR sensor configured to obtain a measurement relating to a GSR of skin via the first and second electrical contacts, (e) an electro-haptic stimulator configured to deliver an electro-haptic stimulus to skin via the first and second electrical contacts, wherein mounting the wearable device to an external body surface comprises mounting the housing to the external body surface using the mount such that the first and second electrical contacts contact skin at the external body surface such that a Galvanic skin resistance (GSR) of the skin at the external body surface can be measured between the first and second electrical contacts and such that an electro-haptic stimulus can be delivered to the skin at the external body surface using the first and second electrical contacts; (ii) obtaining, during a first period of time, a measurement using the GSR sensor; (iii) determining a GSR of the skin at the external body surface based on the measurement obtained using the GSR sensor during the first period of time; and (iv) delivering, during a second period of time, an electro-haptic stimulus using the electro-haptic stimulator.

These as well as other aspects, advantages, and alternatives, will become apparent to those of ordinary skill in the art by reading the following detailed description, with reference where appropriate to the accompanying drawings.

DETAILED DESCRIPTION

Figure 1:
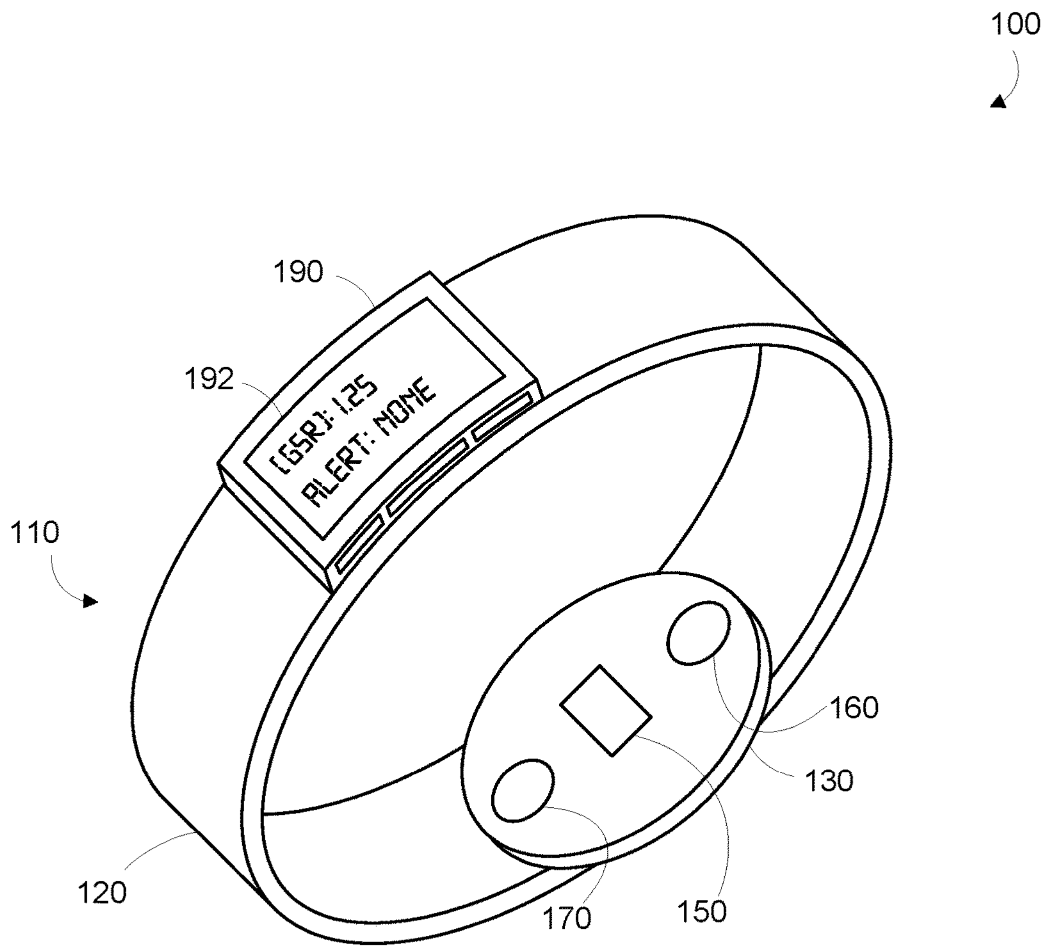
FIG. 1 is a perspective view of an example wearable device.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

A body-mountable device may be configured to measure one or more physiological parameters of the wearer. The one or more physiological parameters can include Galvanic skin resistance, which may be related to perspiration and, thus, the wearer's activity level, sympathetic nervous system activity, and/or emotional state/affect. To measure Galvanic skin resistance, the body-mountable device may include two electrical contacts that protrude from a housing of the device so as to contact the wearer's skin at a location such as the wearer's wrist, forearm, upper arm, leg, thigh, etc. With the electrical contacts against the wearer's skin, electronics within the device may be used to measure an external resistance between the first and second electrical contacts. This external resistance is related to the wearer's Galvanic skin resistance. The electrical contacts could additionally be employed to deliver an electro-haptic stimulus to the wearer's skin. The electro-haptic stimulus could be sensed by the wearer and could be effected by injecting a current through and/or applying a voltage to the electrical contacts. One or more properties (e.g., a waveform, a pulse shape, an amplitude, a pulse width, a pulse frequency, a number of pulses) of the injected current/applied voltage could be specified to elicit an electro-haptic sensation in the wearer. One or more properties of the applied electro-haptic stimulus could be related to an alert or other information generated and/or contained by the wearable device.

In some examples, the body-mountable device includes a housing (e.g., a water-proof housing) and a mount (e.g., a band) that can mount the housing on a particular external body location, such as a wrist. The first and second electrical contacts may protrude from a side of the housing facing the skin at the body location, such that the first and second electrical contacts contact the skin when the housing is mounted on the body location. Electronics disposed in the housing may include a GSR sensor configured to obtain a measurement relating to the GSR of the skin at the external body surface, via the first and second electrical contacts. Electronics disposed in the housing may additionally include an electro-haptic stimulator configured to generate current and/or voltage signals to deliver an electro-haptic stimulus to the skin at the external body surface, via the first and second electrical contacts.

In some examples, the GSR sensor includes a reference voltage source configured to provide a reference voltage (relative to the second electrical contact) and a resistor (having a reference resistance) connected between the reference voltage source and first electrical contact. In this way, the reference resistance of the resistor and the external resistance between the first and second electrical contacts may act as a voltage divider, such that a fraction of the reference voltage appears across the first and second electrical contacts; the fraction is related to the external resistance and the reference resistance. The electronics in the housing may further include a voltage sensor configured to sense the fraction of the reference voltage between the first and second electrical contacts. In one example, the voltage sensor includes an operational amplifier configured as a voltage follower and an analog-to-digital converter that provides a digital output representative of the voltage from the operational amplifier.

The electronics in the housing may also include the electro-haptic stimulator. The elector-haptic stimulator could include a boost convertor or some other source of a specified voltage (e.g., 10 volts to 200 volts). The boost convertor or other specified-voltage source could be operated to apply one or more electrical pulses to the skin of a wearer through the first and second electrical contacts. One or more properties of the at least one electrical pulse could be specified to elicit an electro-haptic sensation in the skin of the wearer. For example, a voltage of the electrical pulse could be a specified voltage between 30 volts and 100 volts. In some examples, the specified voltage could be related to the measured GSR. In some examples, one or more properties of the at least one electrical pulse could be related to information available on the wearable device. For example, a pulse width of the electrical pulse could indicate a health state of the wearer (e.g., an electrical pulse having a first specified duration could be applied to the wearer when the health state of the wearer is a first state and an electrical pulse having a second specified duration could be applied to the wearer when the health state of the wearer is a second state).

Properties (e.g., an amplitude, a duration, a frequency, a pulse shape) of electric pulses or other elements of electro-haptic stimuli delivered by wearable devices described herein are selected to be safe to a wearer and to not cause pain or discomfort to the wearer. Properties of electro-haptic stimuli are selected such that a wearer experiences a noticeable tactile sensation (e.g., light touch, vibration) when the electro-haptic stimuli are delivered to the wearer. In addition to selecting properties of electro-haptic stimuli to provide a noticeable tactile sensation without causing discomfort, hardware elements of a wearable device could be configured to prevent discomfort and to ensure safety (e.g., by making the wearable device fail-safe). Clamping diodes, blocking capacitors and/or resistors, and/or other electronic components could be included in a wearable device and configured such that a voltage, current, or other property of electro-haptic stimuli delivered to a wearer does not exceed specified safe limits (e.g., a maximum voltage, a maximum current) such that use of the wearable device by the wearer is safe and does not cause discomfort.

Electro-haptic stimulus could be delivered to indicate other information. Example information includes but is not limited to an indication that the wearer has traveled a certain distance (e.g., delivering a stimulus for every mile traveled), an indication that the wearable device (or some other system in communication with the wearable device) has detected an anomaly in a health state of the wearer (e.g., a heart rate of the wearer is too high), an indication that the wearer has received some communications from a remote system (e.g., that a cellphone of the user, in communication with the wearable device, has received an email, a voicemail, a text message, a voice call, or some other communications). Properties of the electro-haptic stimulus (e.g., an amplitude, a frequency, a pattern of stimulus pulses) could be related to the indicated information. For example, a first pattern of pulses could be delivered to indicate that a cellphone of the wearer has received an email, and a second pattern of pulses could be delivered to indicate that a detected heart rate of the wearer has increased above a threshold. The properties of the delivered electro-haptic stimuli and/or the mapping between such properties and indicated information could be controlled by a wearer.

Note that, while embodiments described herein are configured to deliver an electro-haptic stimulus to and/or detect a GSR of skin in electrical contacts with two electrical contacts (e.g., 160, 170), applications and configurations are anticipated that include more than two electrical contacts. The more than two electrical contacts could be configured and/or operated to determine a GSR corresponding to multiple regions of skin proximate to respective pairs of electrical contacts, to determine a GSR having a greater accuracy or some other improved metric, to detect an EMG of muscles beneath the proximate skin, or to detect some other information. The more than two electrical contacts could be operated to deliver different electro-haptic stimuli using different pairs of electrical contacts (e.g., to indicate different information/alerts by delivering electro-haptic stimulation to a corresponding pair of electrical contacts), to ensure that electro-haptic stimulation can be safely delivered across changing skin or other conditions, or to enable some other application.

In some examples, the body-mountable device may include a user interface that is configured to provide user-discernible indications (e.g., visual, audible, and/or tactile indications) of one or more physiological parameters measured and/or determined by the device, such as Galvanic skin resistance. In some examples, the user interface could additionally provide a means for one or more settings of the electro-haptic stimulator (e.g., an amplitude, a frequency, a maximum current) to be specified by a wearer according to the wearer's preferences. In some examples, the body-mountable device may include a wireless communication interface that can transmit data to an external device, for example, using Bluetooth, ZigBee, WiFi, ANT, and/or some other wireless communication protocol. The data transmitted by the wireless communication interface may include data indicative of one or more physiological parameters measured by the device, such as Galvanic skin resistance. The wireless communications interface could additionally or alternatively be configured to receive data from an external system and to deliver an electro-haptic stimulus to a wearer based on the received data (e.g., an electro-haptic stimulus could be delivered to a wearer to alert the wearer that the wearer has received an email or other electronic communications).

II. Example Wearable Devices

A wearable device 100 can be configured to measure a Galvanic skin resistance (GSR) of skin at an external body surface proximate to the wearable device 100. The wearable device 100 can also be configured to deliver an electro-haptic stimulus to the skin at the external body surface proximate to the wearable device 100. The term "wearable device," as used in this disclosure, refers to any device that is capable of being worn at, on or in proximity to an external body surface, such as a wrist, ankle, waist, chest, or other body part. A mount 110, such as a belt, wristband, ankle band, etc. can be provided to mount the device at, on or in proximity to the external body surface. In some embodiments, a mount could additionally or alternatively include an adhesive. For example, a mount could include and adhesive and could be configured such that it could be used to mount a wearable device to an external body surface of a wearer without wrapping around a part of the wearer (e.g., a limb). The mount 110 may prevent the wearable device 100 from moving relative to the body to ensure consistent contact between the wearable device 100 and the skin to enable consistent measurement of the GSR of the skin and/or delivery of electro-haptic stimulus to the skin. In one example, shown in FIG. 1, the mount 110, may take the form of a strap or band 120 that can be worn around a part of the body.

A housing 130 is disposed on the mount 110 such that the housing 130 can be positioned on an external surface of the body. In this position, a first electrical contact 160 and a second 170 electrical contact protruding from the housing 130 could contact skin at the external surface of the body such that the GSR of the skin at the external surface of the body could be measured between and an electro-haptic stimulus could be delivered to the skin at the external body surface through the first and second electrical contacts 160, 170. In some examples, the first and second electrical contacts 160, 170 could be further configured to interface with a charger or other device such that a rechargeable battery that powers the wearable device 100 could be charged through the first and second electrical contacts 160, 170. Additionally or alternatively, such a rechargeable battery could be charged wirelessly using a coil and/or other components of the wearable device 100.

The first and second electrical contacts 160, 170 could be composed of an electrically conductive material, such as a metal or a combination of metals, or a nonmetal conductor. The first electrical contact 160 and second electrical contact 170 could be composed of the same material or different materials. The first and second electrical contacts 160, 170 could each be composed of a single material or could be composed of multiple materials. For example, the electrical contacts 160, 170 could have a bulk composed of one material and a surface plating of another material. For example, the electrical contacts 160, 170, could have a bulk composed of copper and a surface composed of gold or of gold alloyed with nickel and/or cobalt. The surface layer could be deposited by a number of methods familiar to one skilled in the art; for example, electroplating. Other compositions are possible, as well.

The first and second electrical contacts 160, 170 could be spring loaded. That is, the electrical contacts 160, 170 could be configured to include one or more springs or other elements that could be reversibly compressed. The electrical contacts 160, 170 could be spring loaded in a direction perpendicular to an external surface of the body to which the housing 130 could be mounted. That is, the electrical contacts 160, 170 could be spring loaded in order to improve and/or make more consistent an electrical connection between the electrical contacts 160, 170 and skin of the external body surface to which the housing 130 was mounted by the mount 110. Alternatively, first and second electrical contacts 160, 170 could be fixed relative to housing 130.

The geometry of the aspects of the electrical contacts 160, 170 that protrude from the housing 130 could be configured to improve and/or make more consistent an electrical connection between the electrical contacts 160, 170 and skin of the external body surface to which the housing 130 was mounted by the mount 110. For example, the protruding aspects of the electrical contacts 160, 170 could be hemispherical, conical, parabolic, cylindrical, or shaped in some other manner. The electrical contacts 160, 170 could be flat or substantially flat plates (e.g., rectangular, triangular, or other-shaped plates protruding from the housing 130). The electrical contacts 160, 170 could have a faceted geometry. For example, the electrical contacts 160, 170 could be triangular, rectangular, or other-shapes pyramids. The protruding aspects of the electrical contacts 160, 170 could have, for example, a characteristic size (e.g., diameter of cylinders, cones, or hemispheres, width of rectangular prisms or plates, or some other measure of size) between 1 and 5 millimeters. Further, the protruding aspects of the electrical contacts 160, 170 could have an inscribed, cast, and/or pressed texture or pattern. Additionally or alternatively, the exposed aspects of the electrical contacts 160, 170 could be roughened mechanically, chemically, or by some other method. Other geometries, sizes, surface treatments, and other aspects of the configuration of the electrical contacts 160, 170 are anticipated.

The electrical contacts 160, 170 could be arranged a distance apart such that a GSR measured using the electrical contacts 160, 170 and/or an electro-haptic stimulus delivered using the electrical contacts 160, 170 could have a desired property or properties. For example, the electrical contacts 160, 170 could be separated by a distance of between 1 and 50 millimeters, such as about 25 millimeters.

The electrical contacts 160, 170 could be disposed on the housing 130 such that, if the housing 130 is mounted to a wrist of a wearer of the wearable device 100, the electrical contacts 160, 170 would be arranged on a line substantially parallel to the bones of the forearm of the wearer (i.e., the humerus and ulna). Other distances and directions are also possible.

The housing 130 could be configured to be water-resistant and/or water-proof. That is, the housing could be configured to include sealants, adhesives, gaskets, welds, press-fitted seams, and/or other joints such that the housing 130 was resistant to water entering an internal volume or volumes of the housing 130 when the housing 110 is exposed to water. The housing 130 could further be water-proof, i.e., resistant to water entering an internal volume or volumes of the housing 130 when the housing 130 is submerged in water. For example, the housing 130 could be water-proof to a depth of 1 meter, i.e., configured to resist water entering an internal volume or volumes of the housing 130 when the housing 130 is submerged to a depth of 1 meter. Further, the interface between the housing 130 and the first and second electrical contacts 160, 170 protruding from the housing 130 could be configured such that the combination of the housing 130 and the electrical contacts 160, 170 is water-resistant and/or water-proof.

The wearable device 100 includes electronics (not shown in FIG. 1) electronically coupled to the first and second electrical contacts 160, 170. The electronics are configured to measure a Galvanic skin resistance (GSR) of and to deliver an electro-haptic stimulus to the skin at an external surface of the body proximate to the housing 130, using the first and second electrical contacts 160, 170 when the wearable device 100 is mounted to the external surface of the body.

The electronics may include a GSR sensor configured to obtain a measurement relating to the GSR of the skin at the external surface of the body, via the first and second electrical contacts 160, 170. The GSR sensor could include a reference voltage source electrically connected to the first electrical contact 160 through a resistor having a reference resistance. The GSR sensor may also include a voltage sensor electrically connected to the first electrical contact 160. The reference voltage source generates a reference voltage relative to the second electrical contact 170 and the voltage sensor measures a voltage between the first electrical contact 160 and the second electrical contact 170.

A GSR of skin proximate to the electrical contacts 160, 170 could be determined based on a measurement relating to the GSR of the skin obtained using the GSR sensor when the wearable device 100 is mounted to the external surface of the body and when the rectifier is reverse biased. In some examples, the measurement relating to the GSR of the skin could include a measurement of the voltage between the first and second electrical contacts 160, 170, and the GSR of skin proximate to the electrical contacts 160, 170 could be determined based on the measured voltage, the value of a reference voltage produced by a reference voltage source, a resistance of a reference resistor, and/or other factors. For example, the GSR could be determined by calculating a multiple of the reference resistance corresponding to the measured voltage divided by a difference, where the difference is the measured voltage subtracted from the reference voltage. Other methods of determining a GSR could be used, for example a lookup table relating measured voltages to GSR values.

The electronics may include an electro-haptic stimulator configured to deliver an electro-haptic stimulus to the skin at the external surface of the body, via the first and second electrical contacts 160, 170. Delivering an electro-haptic stimulus may include applying one or more electric pulses to skin at the external surface of the body such that a wearer of the wearable device 100 experiences a tactile sensation (e.g., a vibration, a texture, a touch, a pressure) having one or more properties (e.g., an intensity, a duration) related to the delivered electro-haptic stimulus. The electric pulse could have a specified voltage and/or current, as well as a specified pulse shape and/or duration.

Voltage pulses applied to skin using the electrical contacts 160, 170 could have specified amplitudes or other properties according to an application and/or according to properties of the skin at the external body surface or other properties of a wearer. Preferentially, the amplitude of a pulse applied through the electrical contacts 160, 170 is between approximately 30 volts and approximately 100 volts. In some embodiments, the amplitude could be between approximately 50 volts and approximately 60 volts. Delivering an electro-haptic stimulus could include delivering a single pulse of voltage and/or current and/or a train of pulses. Individual pulses could have a specified pulse width, pulse shape (e.g., sinusoid, raised cosine, triangular, square, sawtooth), or other properties. A train of stimuli (i.e., a series of individual pulses) could include a series of similar pulses or a combination of pulses having respective specified properties. For example, a train of stimuli could include an alternating sequence of first pulses having a positive polarity (i.e., including a specified positive voltage and/or current) and first pulse width and first pulse amplitude and second pulses having a negative polarity and second pulse width and second pulse amplitude. In one embodiment, an injected amount of charge (i.e., a current amplitude times a duration of a pulse) during the first pulse could be balanced by a substantially equal and opposite injected amount of charge during the second pulse. Sets of pairs or other combinations of pulses could be repeated at a specified rate or frequency to comprise a train of stimuli and/or could be delivered individually. A specified latency or latencies could separate in time individual pulses within a pair or other combination of pulses.

In some examples, one or more properties (e.g., a voltage) of an electro-haptic stimulus (e.g., one or more pulses of voltage and/or current) delivered to the skin at the external body surface could be related to a determined GSR of the skin at the external body surface. For example, the specified voltage could be related to a multiple of the determined GSR (e.g., such that current injected into the skin due to the electro-haptic stimulus had an amplitude within a specified range). Additionally or alternatively, the specified voltage or other properties of the electro-haptic stimulus could be related to the determined GSR in other ways. For example, a specified voltage or other property of an electro-haptic stimulus pulse could be related to a determined GSR by a nonlinear function, a discontinuous mapping, or by some other function. In some examples, one or more properties of the relationship between a specified voltage or other property of the electro-haptic stimulus could be set by a wearer of the wearable device 100 (e.g., to set a preferred intensity of the electro-haptic stimulus, as sensed by the wearer).

Electro-haptic stimuli could be generated by the electro-haptic stimulator and delivered to the skin of a wearer using the electrical contacts 160, 170 to indicate alerts or other information to the wearer. In some examples, an electro-haptic stimulus could be delivered to indicate that a specified point in time has occurred (e.g., the electro-haptic stimulator could operate as an alarm clock). In some examples, an electro-haptic stimulus could be delivered to indicate a health state of the wearer. The health state of the wearer could be detected by the wearable device 100 (e.g., using the GSR sensor) and/or determined by a system in communication with the wearable device 100. A change in the health state, the detection of a specific health state (e.g., a detected pulse rate outside of a specified range), or some other property or condition of the health state of the wearer of the wearable device 100 could be indicated using the electro-haptic stimulator. Other information available on the wearable device 100 could be indicated by the electro-haptic stimulator. Examples include but are not limited to communications received and/or initiated from a remote system in communications with the wearable device 100 (e.g., texts, phonecalls, instant messages, emails, or other communications received by a smartphone or other device in wireless communication with the wearable device 100), a status related to the location or movements of the wearer (e.g., that the wearer has run an additional mile or kilometer), that the wearer's environment is about to experience inclement weather, or some other information.

Further, one or more properties of the delivered electro-haptic stimulus could be related to the indicated information/alert. For example, an intensity, a frequency, a duration, a pattern (e.g., several pulses and/or trains of pulses of electro-haptic stimulus having specified durations and specified relationships in time), or some other property of delivered electro-haptic stimulus could be specified related to the indicated information/alert. For example, a delivered electro-haptic stimulus comprising two short periods of stimulation followed by a long period of stimulation could be delivered to indicate that the wearer has received an email, and three short periods of stimulation could indicate that the wearer has received a text message. Other patterns or other specified properties of delivered electro-haptic stimulus could be configured to indicate additional or alternative information and/or alerts. Further, a wearer of the wearable device 100 could operate the wearable device (e.g., through a user interface 190 of the wearable device, through a user interface presented by a smartphone or other device in communication with the wearable device 100) to specify properties of electro-haptic stimuli that are used to indicate various alerts and/or information.

The electro-haptic stimulator could include a boost converter (i.e., at least an inductor, an electronic switch, a rectifier, and a voltage source) configured to generate electric pulses at a specified voltage or having some other specified property or properties. The pulses generated by the boost converter could be applied across the electrical contacts 160, 170 to deliver an electro-haptic stimulus. A specified voltage or other properties of the output of the boost converter could be related to a specified inductor value, a specified voltage of the voltage source of the boost converter, a specified timing (e.g., duration, frequency) of operation of the electronic switch, or some other operation or configuration of the boost converter. In some embodiments, the boost converter could be operated to generate a continuous source of a specified voltage (e.g., by coupling the output of the boost converter to a capacitor and/or some other filtering elements) and an electronic switch or other elements could be configured to apply the generated voltage as electric pulses to the electrical contacts 160, 170. Additional or alternative sources of a specified voltage (e.g., battery stacks, a switched-mode power supply, a buck converter, a boost-buck converter, a split-pi converter, a SEPIC converter, a transformer, a charge pump, a voltage doubler/multiplier) could be included in an electro-haptic stimulator.

The electro-haptic stimulator or other elements of the wearable device 100 could be configured to prevent injury of a wearer and/or damage to the wearable device 100 due to operation of the electro-haptic stimulator to deliver an electro-haptic stimulus to skin at the external body surface proximate to the electrical contacts 160, 170. Clamping diodes and/or associated blocking resistors could be included in the wearable device 100 and configured to prevent voltages and/or currents above a certain specified maximum from being applied to the electrical contacts 160, 170 (and thus to the skin of the wearer) and/or to elements of the wearable device (e.g., components (e.g., an ADC) of the GSR sensor, components of a recharger coupled to the electrical contacts 160, 170). Additionally or alternatively, one or more electronic switches (e.g., FETs, BJTs, micro-relays) could be included in the wearable device and operated to disconnect elements of the wearable device (e.g., the GSR sensor, a recharger) from the electrical contacts 160, 170 when the electro-haptic stimulator is applying voltages across and/or currents through the electrical contacts 160, 170. A blocking capacitor (i.e., a capacitor having a high specified value of capacitance) could be electrically disposed between one or more or the electrical contacts 160, 170 and the electro-haptic stimulator to prevent the electro-haptic stimulator from injuring the skin of the external body surface and/or causing electrochemical damage to the electrical contacts 160, 170 (e.g., by preventing the application of direct current to the skin for a protracted period of time, by ensuring that current injected into the skin through the electrical contacts 160, 170 is essentially balanced). Other operations and configurations of the wearable device 100 to prevent injury of a wearer and/or damage to the wearable device 100 are anticipated.

The electrical contacts 160, 170 protruding from the housing 130 could additionally be used for other purposes. For example, electronics disposed in the wearable device 100 could be used to sense an electrocardiogram (ECG) signal, a Galvanic skin potential (GSP), an electromyogram (EMG) signal, and/or some other physiological signal present at the electrical contacts 160, 170. Additionally or alternatively, the electrical contacts 160, 170 could be used to detect the presence of a charging device or some other electronic system electrically connected to the electrical contacts 160, 170. The electronics could then use the electrical contacts 160, 170 to receive electrical energy from the charging device or other system to recharge a rechargeable battery of the wearable device 100 and/or to power the wearable device 100. Such a rechargeable battery could additionally or alternatively be recharged wirelessly using electromagnetic energy received by a coil and other wireless charging circuitry disposed in the wearable device 100.

In some examples, the housing 130 further includes at least one detector 150 for detecting at least one other physiological parameter, which could include any parameters that may relate to the health of the person wearing the wearable device. For example, the detector 150 could be configured to measure blood pressure, pulse rate, respiration rate, skin temperature, etc. At least one of the detectors 150 could be configured to non-invasively measure one or more targets in blood circulating in subsurface vasculature proximate to the wearable device. In a non-exhaustive list, detector 150 may include any one of an optical (e.g., CMOS, CCD, photodiode), acoustic (e.g., piezoelectric, piezoceramic), electrochemical (voltage, impedance), thermal, mechanical (e.g., pressure, strain), magnetic, or electromagnetic (e.g., RF, magnetic resonance) sensor.

The wearable device 100 may also include a user interface 190 via which the wearer of the device may receive one or more recommendations or alerts generated from a remote server or other remote computing device, or from a processor within the device. The alerts could be any indication that can be noticed by the person wearing the wearable device. For example, the alert could include a visual component (e.g., textual or graphical information on a display), an auditory component (e.g., an alarm sound), and/or tactile component (e.g., a vibration). Further, the user interface 190 may include a display 192 where a visual indication of the alert or recommendation may be displayed. The display 192 may further be configured to provide an indication the battery status of the device or an indication of any measured physiological parameters, for instance, the GSR being measured by the device.

Figure 2A:
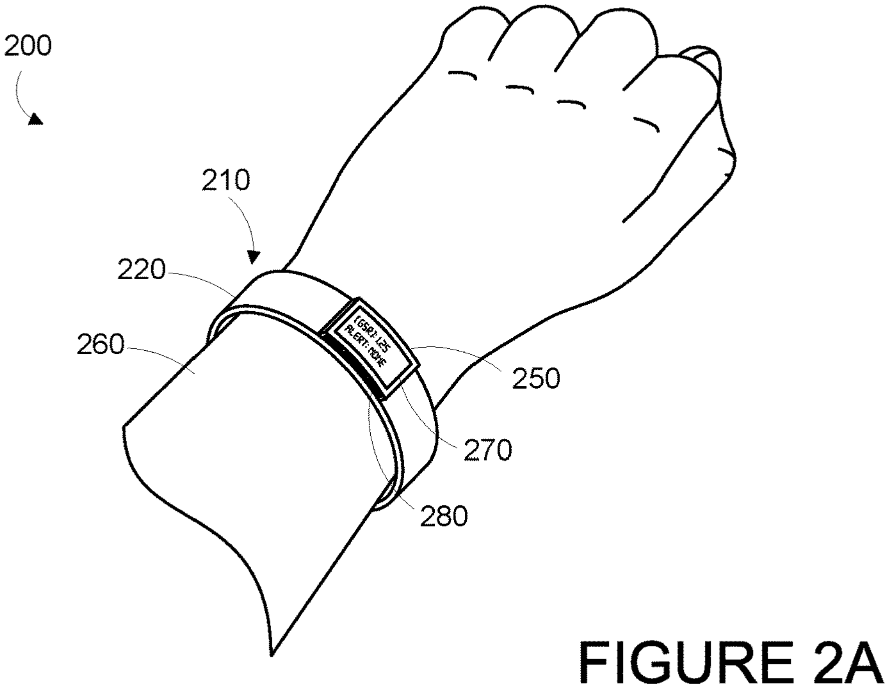
FIG. 2A is a perspective top view of an example wrist-mountable device, when mounted on a wearer's wrist.
Figure 2B:
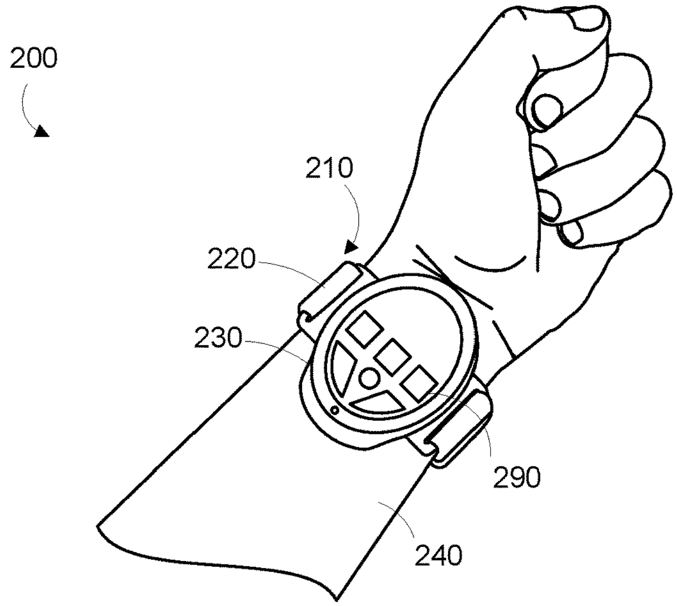
FIG. 2B is a perspective bottom view of the example wrist-mountable device shown in FIG. 2A, when mounted on a wearer's wrist.

In some examples, the wearable device is provided as a wrist-mounted device, as shown in FIGS. 2A, 2B, 3A-3C, 4A, 4B, 5 and 6. The wrist-mounted device may be mounted to a person's wrist with a wristband or cuff, similar to a watch or bracelet. As shown in FIGS. 2A and 2B, the wrist mounted device 200 may include a mount 210 in the form of a wristband 220, a housing 230 positioned on the anterior side 240 of the wearer's wrist, and a user interface 250 positioned on the posterior side 260 of the wearer's wrist. The wearer of the device may receive, via the user interface 250, one or more recommendations or alerts generated either from a remote server or other remote computing device, or alerts generated by the operation of the wrist mounted device 200 (for example, alerts related to a GSR measured by the wrist mounted device 200). Such a configuration may be perceived as natural for the wearer of the device in that it is common for the posterior side 260 of the wrist to be observed, such as the act of checking a wrist-watch. Accordingly, the wearer may easily view a display 270 on the user interface. Further, the housing 230 may be located on the anterior side 240 of the wearer's wrist. However, other configurations are contemplated. Additionally or alternatively, such recommendations or alerts may be received by the wearer as an electro-haptic stimulus delivered by the wrist mounted device 200.

The display 270 may be configured to display a visual indication of the alert or recommendation and/or an indication of the status of the wearable device or an indication of measured physiological parameters, for instance, the GSR of the skin being measured by the wrist mounted device 200. Further, the user interface 250 may include one or more buttons 280 for accepting inputs from the wearer. For example, the buttons 280 may be configured to change the text or other information visible on the display 270. As shown in FIG. 2B, housing 230 may also include one or more buttons 290 for accepting inputs from the wearer. The buttons 290 may be configured to accept inputs for controlling aspects of the wrist mounted device 200, such as initiating a GSR measurement period, a property of electro-haptic stimuli delivered to the wearer (e.g., a maximum and/or minimum stimulus intensity), or inputs indicating the wearer's current health and/or affect state (i.e., normal, anxious, angry, calm, migraine, shortness of breath, heart attack, fever, "flu-like" symptoms, food poisoning, etc.).

Figure 3A:
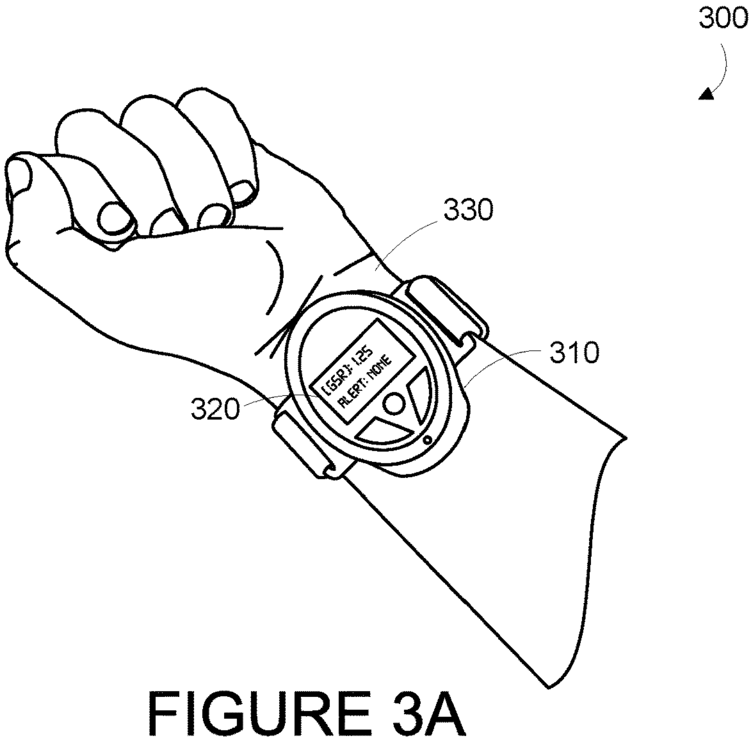
FIG. 3A is a perspective bottom view of an example wrist-mountable device, when mounted on a wearer's wrist.
Figure 3B:
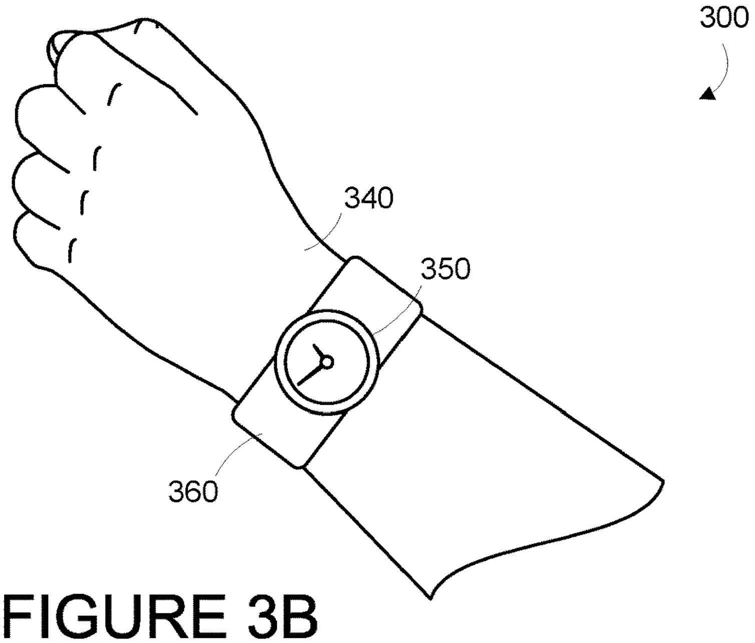
FIG. 3B is a perspective top view of the example wrist-mountable device shown in FIG. 3A, when mounted on a wearer's wrist.
Figure 3C:
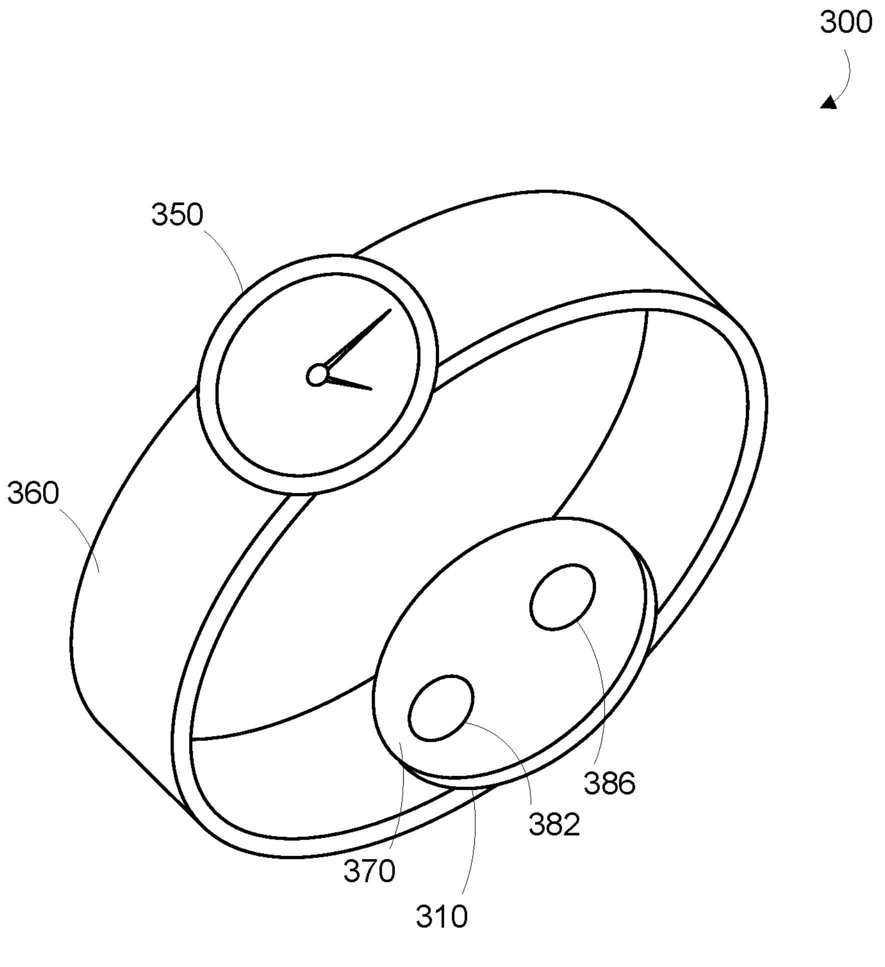
FIG. 3C is a perspective view of the example wrist-mountable device shown in FIGS. 3A and 3B.

In another example wrist-mounted device 300, shown in FIGS. 3A-3C, the housing 310 and user interface 320 are both provided on the same side of the wearer's wrist, in particular, the anterior side 330 of the wrist. On the posterior side 340, a watch face 350 may be disposed on the strap 360. While an analog watch is depicted in FIG. 3B, one of ordinary skill in the art will recognize that any type of clock may be provided, such as a digital clock.

As can be seen in FIG. 3C, the inner face 370 of the housing 310 is intended to be worn proximate to skin on an external surface of the wearer's body. A first electrical contact 382 and a second electrical contact 386 protrude from the inner face 370 of the housing 310 such that the electrical contacts 382, 386 are in stable electrical contact with skin proximate to the inner face 370 when the wrist-mounted device 300 is mounted to a wrist of a wearer. When the wrist-mounted device 300 is mounted to a wrist of a wearer as described, electronics coupled to the electrical contacts 382, 386 could measure a GSR of and/or deliver an electro-haptic stimulus to the skin proximate to the inner face 370. The electrical contacts 382, 386 could be used to enable additional functions of the wrist-mounted device 300; for example, the electrical contacts 382, 386 could also be used to charge a battery of the wrist-mounted device 300.

Figure 4A:
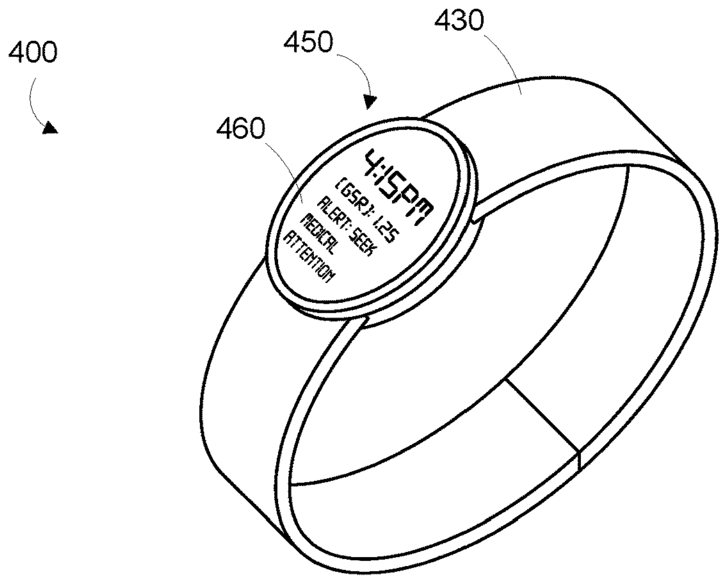
FIG. 4A is a perspective view of an example wrist-mountable device.
Figure 4B:
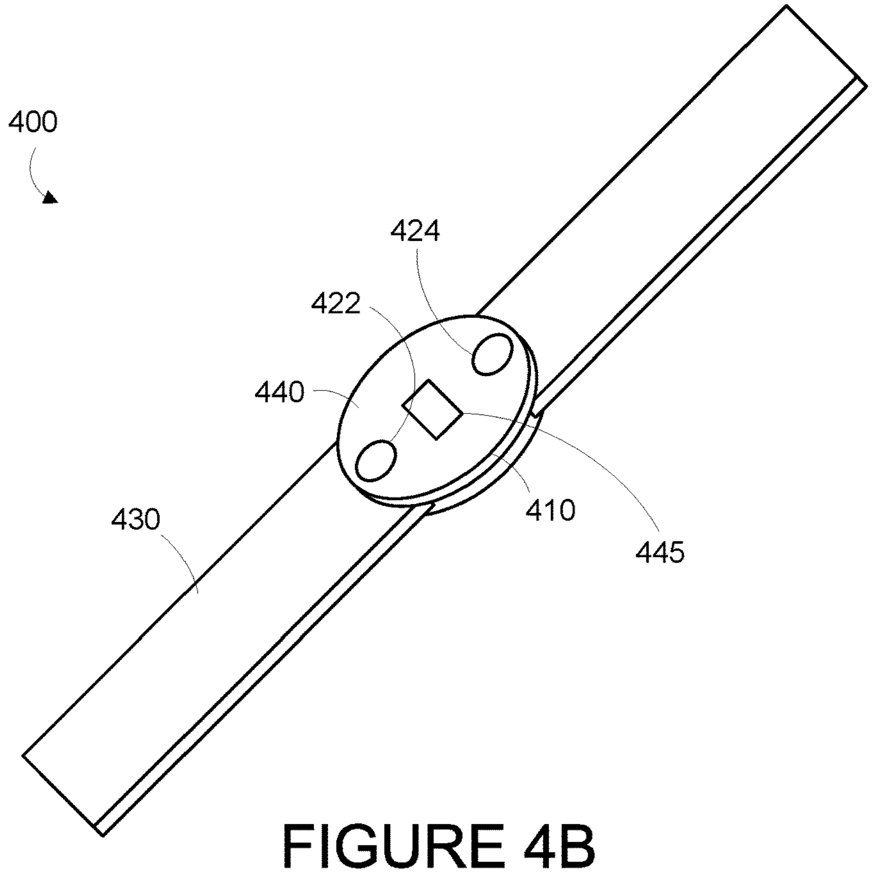
FIG. 4B is a perspective bottom view of the example wrist-mountable device shown in FIG. 4A.

In a further example shown in FIGS. 4A and 4B, a wrist mounted device 400 includes a housing 410, disposed on a strap 430. Inner face 440 of housing 410 may be positioned proximate to a body surface so that a first electrical contact 422 and a second electrical contact 424 protruding from the housing 410 may be used to measure the Galvanic skin resistance (GSR) of and/or deliver an electro-haptic stimulus to skin of the body surface proximate to the housing 410. A detector 445 for detecting at least one other physiological parameter of the wearer could also be disposed on the inner face 440 of the housing 410. A user interface 450 with a display 460 may be positioned facing outward from the housing 410. As described above in connection with other embodiments, user interface 450 may be configured to display data about the wrist mounted device 400, including whether the wrist mounted device 400 is active, a GSR of skin proximate to the inner face 440 of the housing 410 measured using the first and second electrical contacts 422, 424, physiological data about the wearer obtained using the detector 445, and one or more alerts generated by a remote server or other remote computing device, or a processor located on the wrist mounted device 400. The user interface 450 may also be configured to display the time of day, date, or other information that may be relevant to the wearer. Alerts or other information available on the wrist mounted device 400 may be additionally or alternatively indicated to a wearer by one or more electro-haptic stimuli.

Figure 5:
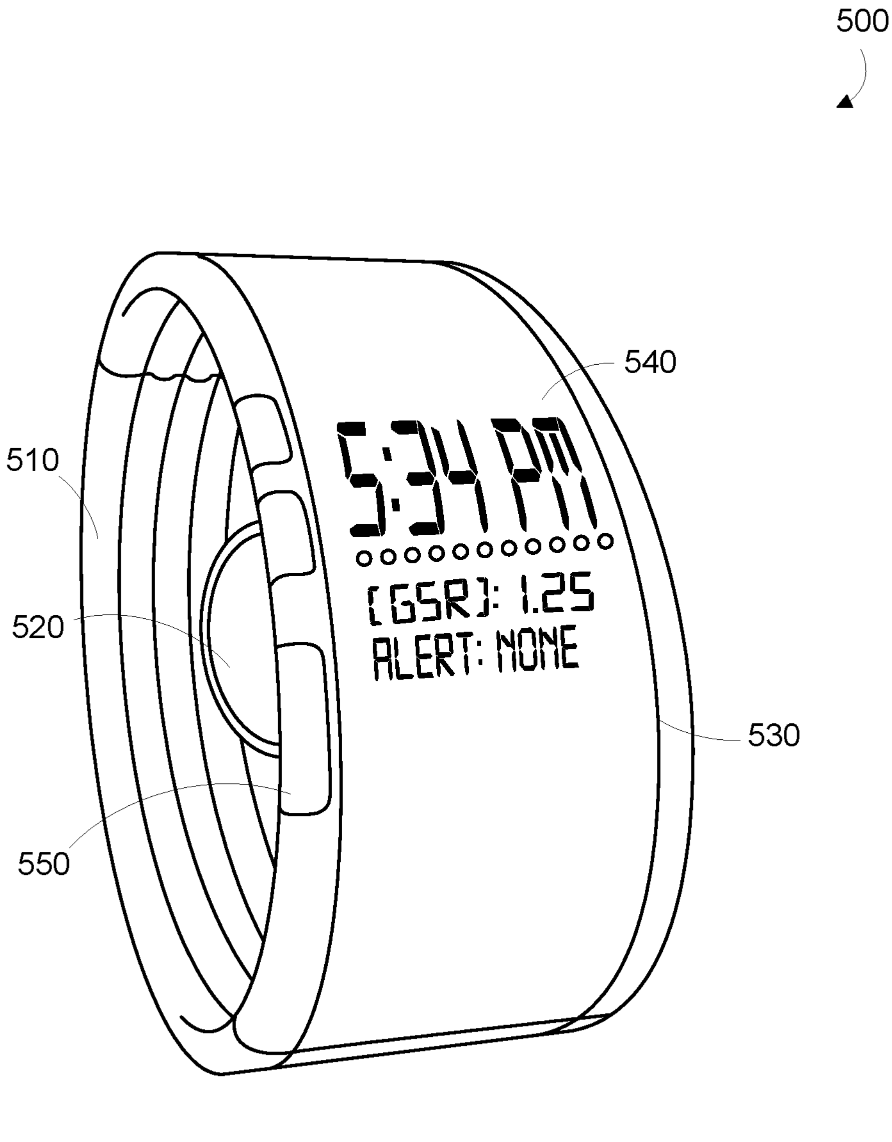
FIG. 5 is a perspective view of an example wrist-mountable device.
Figure 6:
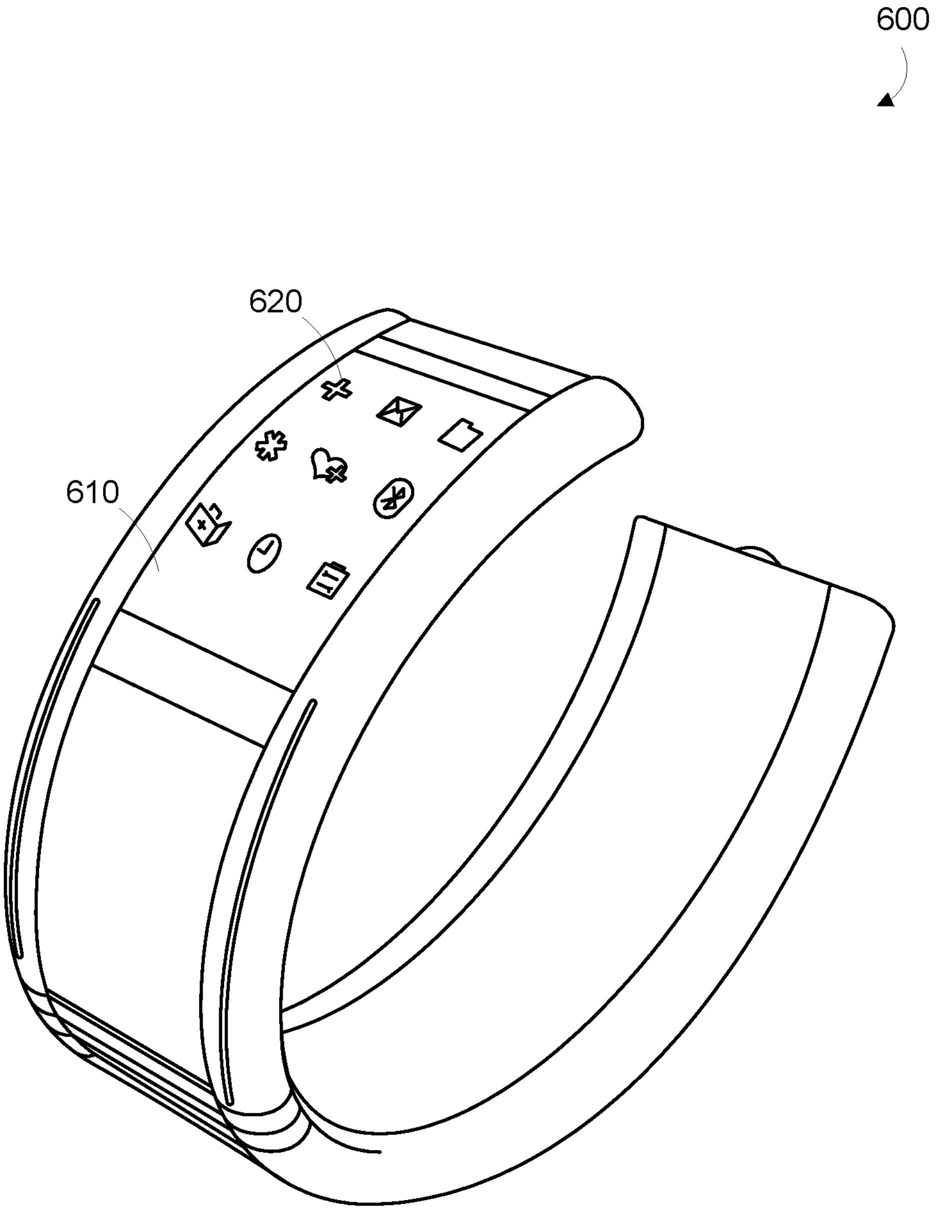
FIG. 6 is a perspective view of an example wrist-mountable device.

As shown in FIG. 5, in a further embodiment, wrist-mounted device 500 may be provided on a cuff 510. Similar to the previously discussed embodiments, device 500 includes a housing 520 and a user interface 530, which may include a display 540 and one or more buttons 550. The display 540 may further be a touch-screen display configured to accept one or more inputs by the wearer. For example, as shown in FIG. 6, display 610 may be a touch-screen configured to display one or more virtual buttons 620 for accepting one or more inputs for controlling certain functions or aspects of the device 600, or inputs of information by the user, such as current health and/or affect state.

Figure 7:
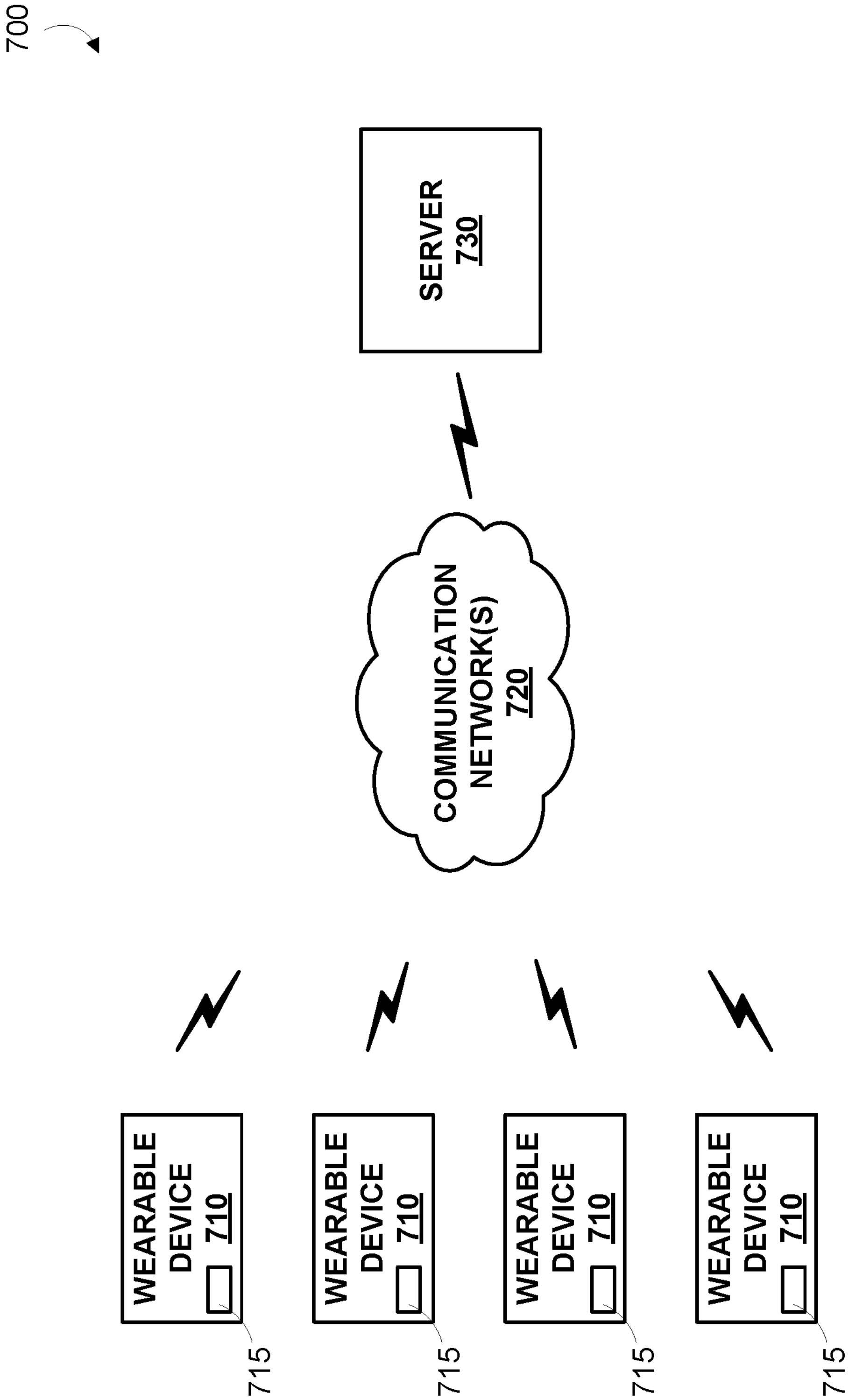
FIG. 7 is a block diagram of an example system that includes a plurality of wearable devices in communication with a server.

FIG. 7 is a simplified schematic of a system 700 including one or more wearable devices 710. The one or more wearable devices 710 may be configured to transmit data via a communication interface 715 over one or more communication networks 720 to a remote server 730. In one embodiment, the communication interface 715 includes a wireless transceiver for sending and receiving communications to and from the server 730. In further embodiments, the communication interface 715 may include any means for the transfer of data, including both wired and wireless communications. For example, the communication interface 715 may include a universal serial bus (USB) interface or a secure digital (SD) card interface. Communication networks 720 may include any of: a plain old telephone service (POTS) network, a cellular network, a fiber network and a data network. The server 730 may include any type of remote computing device or remote cloud computing network. Further, communication network 720 may include one or more intermediaries, including, for example wherein the wearable device 710 transmits data to a mobile phone or other personal computing device, which in turn transmits the data to the server 730.

In addition to receiving communications from the wearable device 710, such as data regarding health and/or affect state as input by the user or GSR measurements of skin of an external surface of the body of the wearer proximate to the wearable device, the server may also be configured to gather and/or receive either from the wearable device 710 or from some other source, information regarding a wearer's overall medical history, environmental factors and geographical data. For example, a user account may be established on the server for every wearer that contains the wearer's medical history. Moreover, in some examples, the server 730 may be configured to regularly receive information from sources of environmental data, such as viral illness or food poisoning outbreak data from the Centers for Disease Control (CDC) and weather, pollution and allergen data from the National Weather Service. Further, the server may be configured to receive data regarding a wearer's health state from a hospital or physician. Such information may be used in the server's decision-making process, such as recognizing correlations and in generating clinical protocols.

Additionally, the server may be configured to gather and/or receive the date, time of day and geographical location of each wearer of the device during each measurement period. If measuring physiological parameters of the user (e.g., GSR), such information may be used to detect and monitor spatial and temporal spreading of diseases. As such, the wearable device may be configured to determine and/or provide an indication of its own location. For example, a wearable device may include a GPS system so that it can include GPS location information (e.g., GPS coordinates) in a communication to the server. As another example, a wearable device may use a technique that involves triangulation (e.g., between base stations in a cellular network) to determine its location. Other location-determination techniques are also possible.

Further, some embodiments of the system may include privacy controls which may be automatically implemented or controlled by the wearer of the device. For example, where a wearer's collected data are uploaded to a cloud computing network for analysis by a clinician, the data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined.

Additionally or alternatively, wearers of a device may be provided with an opportunity to control whether or how the device collects information about the wearer (e.g., information about a user's medical history, social actions or activities, profession, a user's preferences, or a user's current location), or to control how such information may be used. Thus, the wearer may have control over how information is collected about him or her and used by a clinician or physician or other user of the data. For example, a wearer may elect that data, such as health state and physiological parameters, collected from his or her device may only be used for generating an individual baseline and recommendations in response to collection and comparison of his or her own data and may not be used in generating a population baseline or for use in population correlation studies.

III. Example Electronics Disposed in a Wearable Device

Figure 8:
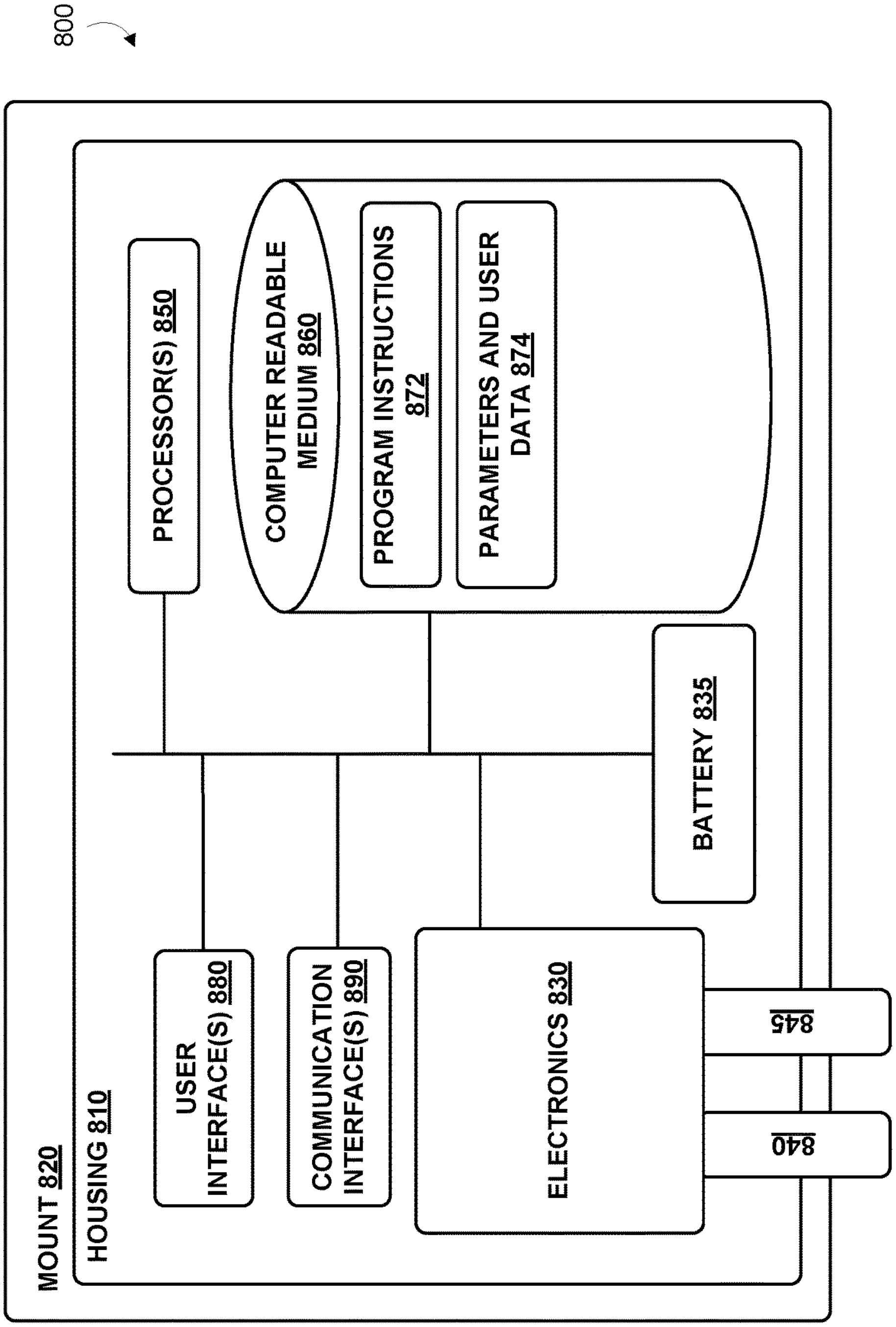
FIG. 8 is a functional block diagram of an example wearable device.

FIG. 8 is a simplified block diagram illustrating the components of a wearable device 800, according to an example embodiment. Wearable device 800 may take the form of or be similar to one of wearable device 100 and/or the wrist-mounted devices 200, 300, 400, 500, 600, shown in FIGS. 1, 2A-B, 3A-3C, 4A-4C, 5 and 6. However, wearable device 800 may also take other forms, for example, an ankle, waist, or chest-mounted device.

In particular, FIG. 8 shows an example of a wearable device 800 having a housing 810, electronics 830 for measuring a Galvanic skin response (GSR) of and for delivering an electro-haptic stimulus to skin of an external surface of wearer proximate to the housing 810, a rechargeable battery 835, a user interface 880, communication interface 890 for transmitting data to a server, and processor(s) 850. The components of the wearable device 800 may be disposed on a mount 820 for mounting the device to an external body surface where the GSR of the skin can be measured and where a delivered electro-haptic stimulus can be sensed by the wearer. The wearable device 800 also includes a first electrical contact 840 and a second electrical contact 845 protruding from the housing 810 and operatively coupled to the electronics 830. The electronics 830 use the first and second electrical contacts 840, 845 to measure the GSR of the skin proximate to the housing 810. Further, the electronics 830 use the first and second electrical contacts 840, 845 to deliver electro-haptic stimulus to the skin proximate to the housing 810. The electronics could be configured to perform other functions using the first and second electrical contacts 840, 845; for example, to interface with a charger or other external device or system to power the electronics and to recharge the rechargeable battery 835. Additionally or alternatively, the rechargeable battery 835 could be charged wirelessly using a coil and/or other components of the wearable device 800 (not shown).

Processor 850 may be a general-purpose processor or a special purpose processor (e.g., digital signal processors, application specific integrated circuits, etc.). The one or more processors 850 can be configured to execute computer-readable program instructions 872 that are stored in a computer readable medium 860 and are executable to provide the functionality of a wearable device 800 described herein.

The computer readable medium 860 may include or take the form of one or more non-transitory, computer-readable storage media that can be read or accessed by at least one processor 850. The one or more computer-readable storage media can include volatile and/or non-volatile storage components, such as optical, magnetic, organic or other memory or disc storage, which can be integrated in whole or in part with at least one of the one or more processors 850. In some embodiments, the computer readable medium 860 can be implemented using a single physical device (e.g., one optical, magnetic, organic or other memory or disc storage unit), while in other embodiments, the computer readable medium 860 can be implemented using two or more physical devices.

The electronics 830 could include a GSR sensor. The GSR sensor could be configured to obtain a measurement relating to the GSR of the skin at the external body surface via the first and second electrical contacts 840, 845. The GSR sensor could include a reference voltage source, a reference resistance, a voltage sensor, and/or other components in order to obtain a measurement relating to a GSR of skin of an external surface of a wearer using the electrical contacts 840, 845 when the housing 810 is mounted to the external surface of the wearer using the mount 820. The electronics 830 could be configured to measure the GSR of the skin by using the electrical contacts 840, 845 and the skin between them to form part of a resistive voltage divider, a Wheatstone bridge, or some other electronic network. A known voltage and/or current could then be applied to the resistive voltage divider, Wheatstone bridge or other electronic network such that a voltage, current or other sensor disposed as part of the electronics 830 could make a measurement that could be used to determine the GSR of the skin. The GSR sensor could additionally or alternatively include other components and/or configurations of components to obtain a measurement relating to the GSR of the skin. For example, the GSR sensor could include components configured to charge and/or discharge a capacitor at a rate related to the GSR of the skin. This rate could be measured (e.g., using a timer and a comparator, by repeatedly sampling the voltage across the capacitor, or some other method) to obtain a measurement relating to the GSR of the skin.

The electronics 830 could include an electro-haptic stimulator. The electro-haptic stimulator could be configured to deliver an electro-haptic stimulus to the skin at the external body surface via the first and second electrical contacts 840, 845. The electro-haptic stimulator could include voltage sources (e.g., boost converters, charge pumps, voltage doublers/multipliers), current sources, flyback transformers, feedback amplifiers, electronic switches, rectifiers, capacitors, filters and/or other components in order to generate and deliver an electro-haptic stimulus to skin of an external surface of a wearer using the electrical contacts 840, 845 when the housing 810 is mounted to the external surface of the wearer using the mount 820. The electronics 830 could be configured to deliver an electro-haptic stimulus to the skin by applying a voltage and/or current waveform having one or more specified properties (e.g., an amplitude, a pulse duration, a frequency, a pulse shape) to the electrical contacts 840, 845 (and thus to the skin of the external body surface that is in contact with the electrical contacts 840, 845). For example, the electronics 830 could include a boost converter configured to generate a voltage pulse having a specified voltage (e.g., between approximately 30 volts and approximately 100 volts). The electronics 830 could additionally or alternatively include other components and/or configurations of components to prevent voltages and/or currents above a certain specified maximum from being applied to the electrical contacts 840, 845 (and thus to the skin of the wearer) and/or to elements of the wearable device (e.g., components of the GSR sensor of the electronics 830, components of a recharger coupled to the electrical contacts 840, 845). For example, the electronics 830 could include clamping diodes and/or associated blocking resistors, electronic switches (e.g., FETs, BJTs, micro-relays) configured to uncouple elements of the electronics (e.g., GSR sensor) from the electrical contacts 840, 845 when the electro-haptic stimulator is generating an electro-haptic stimulus, blocking capacitors, metal-oxide varistors, or other components configured to limit a current and/or voltage applied to the skin of the wearer (i.e., through the electrical contacts 840, 845) and/or to components of the wearable device 800.

The electronics 830 could include additional components. In some examples, the electronics 830 could include a recharger configured to recharge the rechargeable battery 835 and to be powered through the electrical contacts 840, 845. In some examples, the wearable device 800 could be configured to be mounted on an external charger. The external charger could be configured to apply a voltage and/or current to the electrical contacts 840, 845 sufficient to power the recharger to recharge the rechargeable battery 835. The electronics 830 could include rectifiers or other elements disposed electrically between the recharger and the electrical contacts 840, 845. The rectifiers or other elements could be configured to reduce electrical interference in GSR measurements made using the electrical contacts 840, 845 when the wearable device 800 is mounted to an external surface of a wearer and not mounted to an external charger. Additionally or alternatively, the wearable device 800 could include a coil and other components configured to receive electromagnetic energy (e.g., from a wireless charger) and to recharge the rechargeable battery 835 using the received electromagnetic energy. The electronics 830 could include components configured to detect an ECG and EMG or some other electrical signal using the electrical contacts 840, 845. The electronics 830 could include components to operate some other sensors (e.g., accelerometers, optical pulse sensors, pulse oximeters, thermometers) configured to detect one or more properties of a wearer of the wearable device 800 and/or of the environment of the wearable device 800.

Note that, while the electronics 830, processor(s) 850, rechargeable battery 835, and other components are described herein as being disposed in a single housing 810, other configurations are anticipated. In some examples, a wearable device could include multiple housings (e.g., the wearable devices 100, 200, 300 illustrated in FIGS. 1, 2A-B, 3A-C) and the components of the wearable device could be distributed amongst the multiple housings. For example, a first housing could contain some of the electronics 830 (for example, GSR measurement electronics, electro-haptic stimulator electronics) and the electrical contacts 840, 845 could protrude from the first housing. A second housing could include the recharger electronics and the rechargeable battery 835 and elements disposed in the second housing could be electrically connected to elements disposed in the first housing. Other numbers of housings, configurations of housings, and dispositions of components within multiple housings are anticipated.

The program instructions 872 stored on the computer readable medium 860 may include instructions to perform or facilitate some or all of the device functionality described herein. For instance, program instructions 872 could include instructions to operate the electronics 830 to make a GSR measurement using the electrical contacts 840, 845. The program instructions 872 could include instructions to deliver one or more electro-haptic stimuli having one or more respective properties by operating an electro-haptic stimulator or other components of the electronics 830 to apply a current and/or voltage waveform having one or more specified properties (an amplitude, a pulse duration, a pulse shape, a number of pulses, a frequency) to the electrical contacts 840, 845. The program instructions 872 could additionally include instructions to operate other elements of the electronics 830 (e.g., switches, circuit breakers, FETs) to protect other elements of the wearable device 800 that are electrically coupled to the electrical contacts 840, 845 (e.g., a GSR sensor of the electronics 830) from being damaged by the use of the electrical contacts 840, 845 to deliver an electro-haptic stimulus. The program instructions 872 could include instructions to operate based on parameter and user data 874 stored in the computer readable medium 860 and/or modify the parameters and user data 874. For example, the parameters and user data 874 could include calibration data for the wearable device 800 and/or stored GSR measurements made using the wearable device 800.

The program instructions 872 stored on the computer readable medium 860 could include instructions for operating the electronics 830 to make a GSR measurement using the electrical contacts 840, 845. The instructions could include instructions to activate and/or set a value of a current source, a voltage source, a programmable resistor, an ADC and/or some other component(s) of the electronics 830. The instructions could include instructions to operate a voltage or current sensor to make a measurement relating to the GSR. The instructions could include instructions to determine a GSR based on the measurement. The instructions could further include instructions to determine the GSR based on calibration or other data stored in the parameters and user data 874. The instructions could include instructions to determine whether the wearable device 800 was mounted to skin on an external surface of a wearer based on the measurement relating to the GSR.

Other instructions in the program instructions 872 relating to the use of the electronics 830 to measure a GSR using the electrical contacts 840, 845 are anticipated. The program instructions 872 could include instructions to make a plurality of measurements and/or determinations of the GSR at a plurality of points in time using the electronics 830. The program instructions 872 could include instructions to store measurements of the GSR in the parameters and user data 874 and/or later or update calibration or other data in the parameters and user data 874 based on measurements of the GSR or other factors.

The program instructions 872 stored on the computer readable medium 860 could include instructions for operating the electronics 830 to deliver an electro-haptic stimulus using the electrical contacts 840, 845. The instructions could include instructions to activate and/or set a value of a current source, a voltage source, a programmable resistor, a DAC and/or some other component(s) of the electronics 830. For example, the instructions could include instructions to turn on a switch of a boost converter for a specified period of time, where the specified period of time is related to a specified voltage of a pulse of an electro-haptic stimulus. The instructions could include instructions to generate multiple pulses of electro-haptic stimulus at a specified frequency, for a specified duration, or having some other specified property. The instructions could include instructions to generate an electro-haptic stimulus having one or more properties (e.g., a specified voltage) related to a measured GSR of the skin of the wearer. For example, the specified voltage could be equal to a multiple of a specified detected GSR such that some property of the electrohaptic stimulus (e.g., an intensity, an amplitude of injected current) related to the GSR of the skin could be specified.

The instructions could include instructions to generate an electro-haptic stimulus to indicate an alert or other information to a wearer. For example, the instructions could describe the generation of an electrohaptic-stimulus having one or more specified properties in response to the wearer receiving a communication (e.g., a text message, email, phone call, or other communications through a smartphone or other device in communication with the wearable device 800), a change or other property of a health state of the wearer, a pre-specified point in time and/or space being reached, or the generation of some other alert by the wearable device 800 and/or some system in communication with the wearable device 800. Further, the instructions could include instructions to specify one or more properties of the delivered electro-haptic stimulus based on an indicated alert or other information. For example, an intensity, a frequency, a duration, a pattern (e.g., several pulses and/or trains of pulses of electro-haptic stimulus having specified durations and specified relationships in time), or some other property of delivered electro-haptic stimulus could be specified related to the indicated alert or other information. Further, the instructions could include instruction to base such relationships between specified properties of electro-haptic stimuli and indicated alerts or other information based on stored preferences, e.g., preferences specified previously by a wearer of the wearable device 800.

The program instructions 872 stored on the computer readable medium 860 could include instructions for operating components of the wearable device 800 (e.g., the electronics 830) to recharge the rechargeable battery 835 and/or to power the wearable device 800 using the rechargeable battery 835. For example, the instructions could include instructions for operating switches or other electrical components to gate power from the electrical contacts 840, 845 to the recharger and/or from the recharger to the rechargeable battery 835. Additionally or alternatively, the instructions could include instructions to operate a voltage or current sensor (possibly the same sensor used to make GSR measurements) to detect the presence of an external charger in electrical contact with the electrical contacts 840, 845 and/or to detect a charge state of the rechargeable battery 835. A recharger and/or rectifier elements of the electronics 830 could be passive, that is, they could be configured to recharge the rechargeable battery 835 and/or power the wearable device 800 without direct operation by the processor(s) 850 or other elements of the wearable device 800 (other than the electrical contacts 840, 845) when the wearable device 800 is mounted to an external charger or other appropriately configured power source. Additionally or alternatively, a coil and other components of a wireless charger of the wearable device 800 could be configured to receive electromagnetic energy and to charge the rechargeable battery 835 using the received electromagnetic energy.

The program instructions 872 can include instructions for operating the user interface(s) 880. For example, the program instructions 872 could include instructions for displaying data about the wearable device 800, for displaying a measured and/or determined GSR or other information generated by the wearable device 800, or for displaying one or more alerts generated by the wearable device 800 and/or received from an external system. Further, program instructions 872 may include instructions to execute certain functions based on inputs accepted by the user interface(s) 880, such as inputs accepted by one or more buttons disposed on the user interface(s) 880.

Communication interface 890 may also be operated by instructions within the program instructions 872, such as instructions for sending and/or receiving information via an antenna, which may be disposed on or in the wearable device 800. The communication interface 890 can optionally include one or more oscillators, mixers, frequency injectors, etc. to modulate and/or demodulate information on a carrier frequency to be transmitted and/or received by the antenna. In some examples, the wearable device 800 is configured to indicate an output from the processor by modulating an impedance of the antenna in a manner that is perceivable by a remote server or other remote computing device.

In some examples, the communication interface(s) 890 could be operably coupled to the electrical contacts 840, 845 and could be configured to communicate with an external system by using the electrical contacts 840, 845. In some examples, this includes sending and/or receiving voltage and/or current signals transmitted through the electrical contacts 840, 845 when the wearable device 800 is mounted onto an external system such that the electrical contacts 840, 845 are in electrical contact with components of the external system.

In some examples, GSR measurements, properties of delivered electro-haptic stimuli, wearer profiles, history of wearable device use, health state information input by device wearers and generated recommendations and clinical protocols may additionally be input to a cloud network and be made available for download by a wearer's physician. Trend and other analyses may also be performed on the collected data, such as physiological parameter data and health state information, in the cloud computing network and be made available for download by physicians or clinicians.

Further, GSR measurements and health state data from individuals or populations of device wearers may be used by physicians or clinicians in monitoring efficacy of a drug or other treatment. For example, high-density, real-time data may be collected from a population of device wearers who are participating in a clinical study to assess the safety and efficacy of a developmental drug or therapy. Such data may also be used on an individual level to assess a particular wearer's response to a drug or therapy. Based on this data, a physician or clinician may be able to tailor a drug treatment to suit an individual's needs.

In response to a determination by instructions contained in the program instructions 872 that a medical condition is indicated, the wearable device 800 may generate an alert via the user interface 880. The alert may include a visual component, such as textual or graphical information displayed on a display, an auditory component (e.g., an alarm sound), a tactile component (e.g., a vibration), and/or an electro-haptic component (e.g., an electro-haptic stimulus delivered using the electrical contacts 840, 845). The textual information may include one or more recommendations, such as a recommendation that the wearer of the device contact a medical professional, seek immediate medical attention, or administer a medication.

Figure 9:
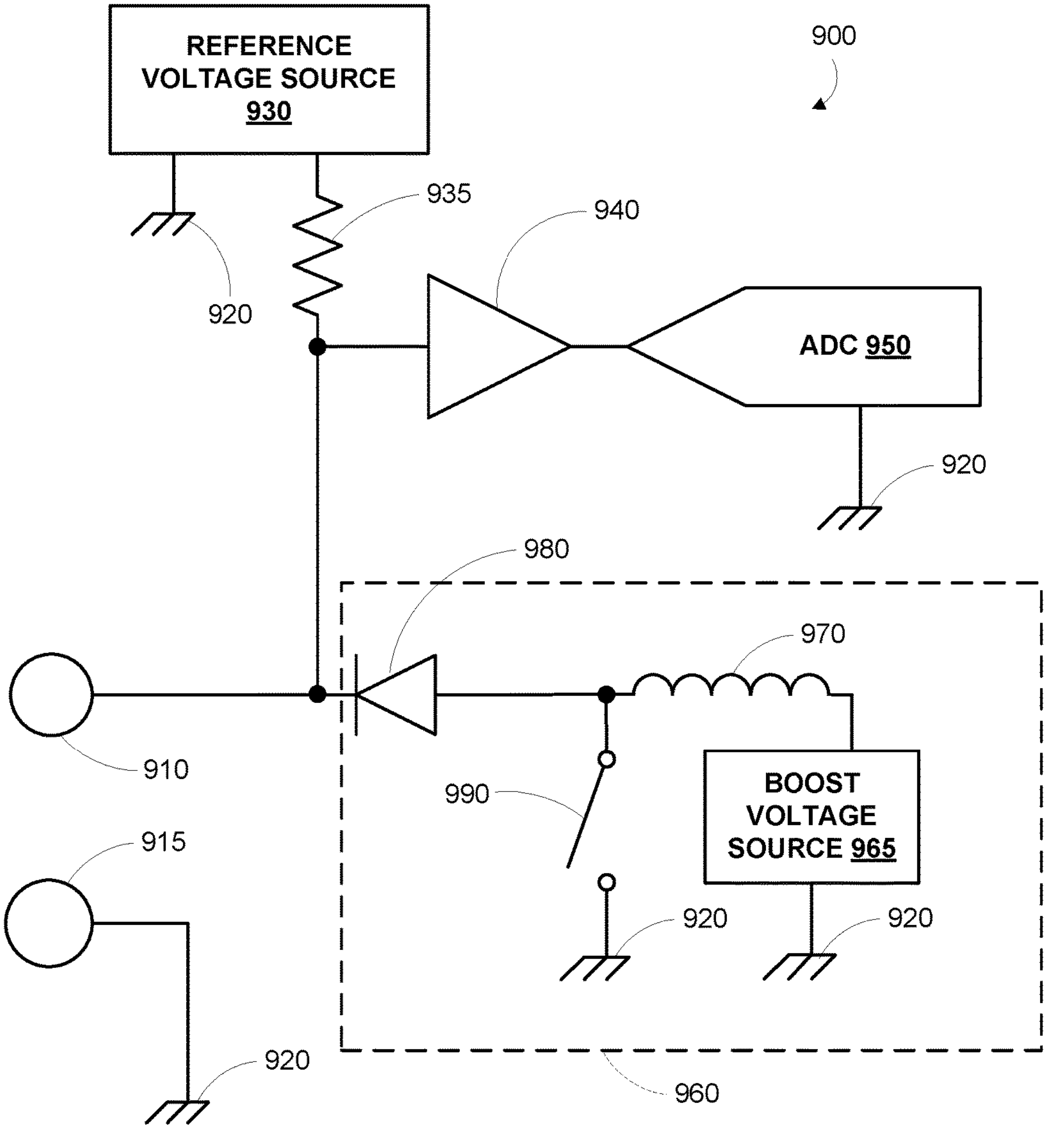
FIG. 9 is a functional block diagram of components disposed in an example wearable device.

FIG. 9 is a simplified circuit diagram of electronics 900 that could be disposed in a wearable device to measure a Galvanic skin response (GSR) and/or deliver an electro-haptic stimulus using a first electrical contact 910 and a second electrical contact 915 disposed in the wearable device. Electronics 900 are configured to include a common electrical ground 920 electrically connected to the second electrical contact 915. The electronics 900 include a GSR sensor configured to obtain a measurement relating to the GSR of skin proximate to the first and second electrical contacts 910, 915. The GSR sensor can include a reference voltage source 930, a resistor 935, and a voltage sensor that includes an amplifier 940 and an ADC 950. The electronics 900 also include an electro-haptic stimulator 960 configured to generate an electro-haptic stimulus and to deliver the electro-haptic stimulus through the first and second electrical contacts 910, 915. The electro-haptic stimulator 960 includes a boost voltage source 965, an inductor 970, a rectifier 980, and an electronic switch 990.

In the example of FIG. 9, the reference voltage source 930 is electrically connected to the first electrical contact 910 through the resistor 935. Additionally, the amplifier 940 has an input electrically connected to the first electrical contact 910 and an output connected to the ADC 950. The boost voltage source 965 is electrically connected to the inductor 970. The inductor 970 is also electrically connected to the first electrical contact 910 through the rectifier 980. The electronic switch 990 is electrically connected between the common electrical ground 920 and the inductor 970 and rectifier 980. The rectifier 980 is configured to be reverse biased when the electronic switch 990 is 'on' (i.e., when the electronic switch 990 is providing a low-impedance path between the common electrical ground 920 and the inductor 970 and rectifier 980); that is, the rectifier 980 is configured to substantially not allow the passage of current through itself when current is flowing through the inductor 970 and electronic switch 990 to charge the inductor 970. Conversely, the rectifier 980 is configured to be forward biased (i.e., to substantially allow the passage of current through itself) when the electronic switch 990 is 'off', allowing a voltage to develop across the inductor 970 and further allowing the large voltage developed across the inductor 970 to be applied to the first electrical contact 910. Further, at least the reference voltage source 930, ADC 950, boost voltage source 965, and electronic switch 990 are electrically connected to the common electrical ground 920 that is electrically connected to the second electrical contact 915.

Electronics 900 could be disposed in a wearable device (e.g., the wearable devices 100, 200, 300, 400, 500, 600, 710, 800 illustrated in FIGS. 1, 2A-B, 3A-C, 4A-B, 5, 6, 7, and 8). Individual elements of the electronics 900 could be embodied as respective discrete components. Additionally or alternatively, one or more elements of the electronics 900 could be incorporated into one or more integrated circuits. In examples where the electronics 900 are included in a wearable device composed or multiple housings or other subassemblies, the elements of the electronics 900 could all be disposed in a single housing or subassembly or elements of the electronics 900 could be disposed in multiple housings or subassemblies and connected using wires, cables, or other means passing between housings or subassemblies.

The GSR sensor can include a voltage sensor coupled to the first electrical contact 910 and configured to measure a voltage between the first electrical contact 910 and the second electrical contact 915. Obtaining a measurement relating to the GSR of skin at an external body surface proximate to the first and second electrical contacts 910, 915 can include measuring the voltage between the first and second electrical contacts 910, 915. The voltage sensor includes an amplifier 940 and an analog-to-digital converter (ADC) 950. The use of an amplifier and ADC, as shown in FIG. 9, for a voltage sensor is meant as an example and not meant to be limiting. For example, the voltage sensor could include an ADC without an amplifier. Additionally or alternatively, the voltage sensor could include an ADC configured to include an amplifier, such that the voltage sensor included an amplifier and an ADC embodied in a single component. Other configurations of voltage sensor are also possible. Further, the GSR sensor could additionally or alternatively include other forms of sensor, including current sensors, voltage and/or current comparators, peak detectors, frequency counters, or other electronic sensing components and/or configurations of components.

The amplifier 940 could be any electronic component capable of amplifying a first voltage appearing at the first electrical contact 910 and generating a second voltage related to the first voltage. The amplifier 940 could be configured to have a gain (including a unity gain), a frequency response, an input impedance, an output impedance, and common-mode-rejection-ratio (CMRR), a power requirement, and/or other specifications according to an application. The amplifier 940 could include one or more transistors. For example, the amplifier could include a transistor configured as a common-source or common-emitter amplifier. The amplifier 940 could include multiple transistors, configured e.g. as a Darlington pair. The transistors could include bipolar junction transistors (BJTs), field-effect transistors (FETs), junction gate field-effects transistors (JFETs), and/or other types of transistors. The amplifier 940 could include one or more operational amplifiers. For example, the amplifier 940 could be an operational amplifier configured as a voltage follower. Other amplifier configurations are anticipated.

The ADC 950 could be part of a microcontroller disposed in a wearable device. The ADC 950 could be configured as a discrete component disposed in a wearable device. The ADC 950 could be operated by a microcontroller or other processor(s) to make a measurement of a voltage and/or current from the amplifier 940 (or, in embodiments lacking the amplifier 940, a voltage and/or current from the first electrical contact 910). The ADC 950 could be a direct-conversion ADC, a successive-approximation ADC, a sigma-delta ADC, or some other type of ADC. The ADC 950 could include an amplifier, a filter, a sample-and-hold, and/or some other components.

The voltage sensor could be used to measure a voltage relating to a GSR of skin proximate to the electrical contacts 910, 915. The voltage sensor could also be used to detect other signals. In some examples, the voltage sensor could be used to detect whether the electrical contacts 910, 915 are in contact with skin proximate to the electrical contacts 910, 915. Additionally or alternatively, the voltage sensor could be used to detect when an external charger or other power source was connected to the first and second electrical contacts 910, 915 and/or a charge state of a rechargeable battery connected to the electronics 900. Other uses of the voltage sensor are anticipated.

The GSR sensor could include additional and/or alternate circuitry than that disclosed above. For example, the GSR sensor could include one or more comparators instead of or in addition to an ADC. The GSR sensor could include linear and nonlinear filtering circuitry and/or voltage isolation circuitry. For example, the GSR sensor could include clamping diodes, blocking resistors, blocking capacitors, electronic switches, or other elements configured to prevent components of the GSR sensor from being damaged by voltages and/or currents generated by the electro-haptic stimulator 960. The GSR sensor could include one or more analog components or functional blocks. The GSR sensor could include analog electronics to perform some analog calculation and/or filtering based on a measured voltage or other signal; the results of this analog calculation and/or filtering could be used to perform some function or could be digitized for use by a processor or microcontroller. For example, the GSR sensor could include analog circuitry to remove a DC offset from a measured voltage and could include a comparator to indicate when the measured voltage (without the DC offset) increased above a threshold value.

The reference voltage source 930 could be any component configured to provide a stable, specified reference voltage relative to a common electrical ground 920. For example, the reference voltage source 930 could include a forward or reverse biased Zener diode, germanium diode, silicon diode, and/or avalanche diode. The reference voltage source 930 could additionally or alternatively include a bandgap voltage reference. The reference voltage source 930 could be temperature stabilized. In some examples, a voltage provided by the reference voltage source could be adjustable, for example by a microcontroller connected to the reference voltage source.

The resistor 935 could be any electronic component having a stable reference resistance value. For example, the resistor could be a thin-film resistor, a thick-film resistor, a laser-trimmed resistor, a wire-wound resistor, or some other type of resistive element. In some examples, the resistor 935 could have an adjustable resistance, and the adjustable resistance could be controlled by e.g. a microcontroller. In some examples, the resistor 935 could have a reference resistance equal to between 1 megaohm and 10 megaohms. For example, the resistor 935 could have a reference resistance of 4 megaohms. In examples where the resistor 935 has a fixed reference resistance, the resistor 935 could be designed to have a known reference resistance. Additionally or alternatively, a reference resistance of the resistor 935 could be determined through calibration or some other method. The determined reference resistance could be stored in a memory accessible to a processor or other system configured to use the electronics 900 to measure the GSR of skin proximate to the electrical contacts 910, 915.

A voltage between the first electrical contact 910 and the second electrical contact 915 sensed by the voltage sensor could be related to a GSR of skin proximate to the electrical contacts 910, 915 when a wearable device including the electronics 900 is mounted on an external body surface of a wearer. For example, the sensed voltage could be a fraction of the reference voltage provided by the reference voltage source 930. The resistor 935 and the GSR of the skin proximate to the electrical contacts 910, 915 could act as a voltage divider. As such, the fraction of the reference voltage could correspond to the GSR of the skin divided by a sum of the GSR and the reference resistance of the resistor 935.

A processor or other system having access to a voltage measured by the voltage sensor could make a determination of the GSR. A processor or other system could make such a determination by determining a multiple of the reference resistance of the resistor 935. The multiple of the reference resistance could correspond to the measured voltage divided by a difference, where the difference corresponds to the measured voltage subtracted from the reference voltage provided by the reference voltage source 930. This determination could be represented by $R_{GSR}=R_{REF}*(V_{SENS}/V_{REF}-V_{SENS}))$, where $R_{GSR}$ is the determined GSR, $R_{REF}$ is the reference resistance of the resistor 935, $V_{SENS}$ is the measured voltage, and $V_{REF}$ is reference voltage.

The processor or other system could additionally or alternatively use the measured voltage to determine whether the electrical contacts 910, 915 are in contact with skin, and/or whether the wearable contacts 910, 915 could be used to make a determination of the GSR of skin proximate to the electrical contacts 910, 915. For example, if the measured voltage was a sufficiently high fraction of the reference voltage, it could be determined that the electrical contacts 910, 915 are not in contact with skin and/or that the GSR of the skin was too large to be accurately determined using the electrical contacts 910, 915 and the electronics 900.

Obtaining a measurement relating to the GSR of skin using the electrical contacts 910, 915 could be affected by the electro-haptic stimulator 960. In some examples, when a wearable device including the electronics 900 is mounted to an external surface of a wearer, a leakage current could flow to or from electro-haptic stimulator 960 to the first electrical contact 910 and from there through the skin. As a result, the measurement obtained by the GSR sensor would be based on the leakage current in addition to the GSR of the skin among other factors relating to the configuration of the GSR sensor (e.g., the reference resistance of the resistor 935, and the reference voltage provided by the reference voltage source 930).

In examples where the obtained measurement is affected by a leakage current, determining a GSR based on the obtained measurement could be accomplished in a variety of ways. In some examples, determining a GSR based on the obtained measurement could be accomplished by adding or subtracting an offset to the obtained measurement. Additionally or alternatively, a more complicated model of the circuit, taking into account the effects of the leakage current, could be used to determine a GSR from the obtained measurement. Additionally or alternatively, a look-up table (LUT) could be used to determine a GSR from an obtained measurement. The LUT could be determined through experiment and/or using models of the electronics 900 or other related systems. In examples where the GSR is determined using a processor (e.g., processor(s) 850 of wearable device 800 in FIG. 8), information about the LUT could be stored in data storage that is accessible to the processor (e.g., in the parameters and user data 874 stored in the computer readable medium 860 in FIG. 8). Other methods for determining a GSR from an obtained measurement in scenarios including a leakage current are anticipated.

The reference voltage source 930 could be configured to be switched; that is, the reference voltage source 930 could be configured such that a processor or other system (not shown) could control the reference voltage source 930 to electrically connect the resistor 935 to a reference voltage, the common electrical ground 920, some other voltage, and/or to substantially disconnect the resistor 935 from any voltage (i.e., to connect the resistor 935 to a relatively high impedance). In some examples, the resistor 935 could be disconnected and/or connected to the common electrical ground to conserve power. In some examples, the reference voltage source 930 could switch repeatedly over time. For example, the reference voltage source 930 could switch between a reference voltage and the common electrical ground 920 at a specified frequency. The GSR could then be determined as a function of frequency by making a plurality of voltage measurements at a higher frequency than the frequency that the reference voltage source 930 was switched. Other methods and applications of switching the reference voltage source 930 are anticipated.

The electro-haptic stimulator 960 could be configured and operated (e.g., the electronic switch 990 and boost voltage source 965) to generate electro-haptic stimuli having one or more specified properties (e.g., a specified current, voltage, amplitude, pulse duration, pulse shape, pulse repetition frequency). The example electro-haptic stimulator 960 illustrated in FIG. 9 includes a boost converter configured to generate voltage pulses and to apply the generated voltage pulses through the rectifier 980 to the first electrical contact 910. Other configurations of electro-haptic stimulator, having additional or alternative elements configured and/or operated differently than as described herein, are anticipated. For example, the electro-haptic stimulator could include a stack of battery cells, a SEPIC converter, a charge pump, a voltage doubler/multiplier, a flyback transformer, or some other source of a specified voltage. In some examples, a voltage source of the electro-haptic stimulator could be operated to produce a continuous source of a specified voltage, and electronic switches, filters, or other elements could be configured and operated to use the continuous source of the specified voltage to produce an electro-haptic stimulus (e.g., one or more electric pulses) having one or more specified properties.

The boost voltage source 965 could be any component configured to provide a stable, specified voltage relative to a common electrical ground 920. For example, the boost voltage source 965 could include a forward or reverse biased Zener diode, germanium diode, silicon diode, and/or avalanche diode. The boost voltage source 965 could additionally or alternatively include a bandgap voltage reference. In some examples, a voltage provided by the boost voltage source 965 could be adjustable, for example by a microcontroller connected to the boost voltage source 965. In some examples, the boost voltage source 965 could be the same as the reference voltage source 930. In some examples, the boost voltage source 965 could be the same as a voltage source used to supply voltage to other elements of a wearable device (e.g., a controller, the ADC, the reference voltage source 930) or could be a voltage generated by a rechargeable battery.

The inductor 970 could be any component having a specified inductance. The inductor 970 could include one or more coils of wire. In some examples, the inductor 970 could be composed of traces on a printed circuit board. In some examples, the inductor 970 could include one or more magnetic cores and/or shields configured to increase the inductance of the inductor 970 and/or to minimize an amount of magnetic flux radiated by the inductor 970 (e.g., by containing and/or directing magnetic flux generated by currents in the inductor 970 using pieces of high-permeability materials).

The rectifier 980 could be any electronic component capable of being configured such that the rectifier 980 substantially allows the flow of current from the inductor 970 to the first electrical contact 910 (i.e., the rectifier 980 is forward biased) when the electronic switch if 'off'. Further, the rectifier 980 is configured such that it allows substantially no current to flow through itself to/from the first electrical contact 910 from/to the inductor 970 (i.e., the rectifier 980 is reverse biased) when the electronic switch 990 is 'off'. The rectifier 980 could be a discrete component or it could be included as part of an integrated circuit including other elements of the electro-haptic stimulator 960 (e.g., the electronic switch 990, the boost voltage source 965) and/or some other integrated circuit(s).

In some examples, the rectifier 980 includes a diode. For example, the rectifier 980 could be a silicon diode, a germanium diode, an avalanche diode, a Schottky diode, a PIN diode, a Zener diode, or some other type of diode. In some examples, the rectifier 980 includes one or more transistors. For example, the rectifier 980 could include bipolar junction transistor(s) (BJTs), field-effect transistor(s) (FETs), junction gate field-effects transistor(s) (JFETs), and/or other types of transistors. The rectifier 980 could be configured to operate without outside control by a processor or other system and/or could be configured to be switched or otherwise controlled by a processor or other system. In some examples, the rectifier 980 could include an electronic switch (for example, a FET) controlled by a processor, or some other system.

The electronic switch 990 could be any component that can be operated to allow substantially no current to flow through itself during a first period of time and to allow current to flow substantially unimpeded (i.e., to have a very low resistance) during a second period of time. The electronic switch 990 could include a FET, a MOSFET, a BJT, an IGBT, or some other switchable electronic component.

The electronic switch 990 could be configured to contact a heat sink or other heat management component to reduce the temperature of the electronic switch 990 during operation. The electronic switch 990 could be configured (e.g., could have a wide and/or or deep channel, gate, or other semiconductor feature) to have a very low 'on'-resistance (e.g., on the order of milli-ohms), a very low gate capacitance, or some other specified properties according to an application.

The electronics 900 could be configured and/or could include additional components to perform additional functions to those described above. In some examples, the electronics 900 could include a recharger configured to receive electrical energy through the electrical contacts 910, 915 and to charge a rechargeable battery and/or power the electronics 900 using the received electrical energy. In some examples, the GSR sensor could be operated to determine a type and/or capacity of a charger electrically connected to the electrical contacts. In some examples, the GSR sensor could be operated to receive communications from an external device that is configured to be connected to the electrical contacts 910, 915 and to transmit information to the electronics 900 by modulating a voltage waveform presented to the electrical contacts 910, 915. In some examples, the electronics 900 could be configured to measure other physiological properties of a wearer of a device including the electronics 900. For example, the GSR sensor could be configured to sense a Galvanic skin potential, and electrocardiogram (ECG), an electromyogram (EMG), and/or other signals and/or properties of a wearer by using the electrical contacts 910, 915. Other configurations and applications of the electronics 900 and of wearable devices or other systems including the electronics 900 are anticipated.

IV. Illustrative Methods for Operating a Wearable Device

Figure 10:
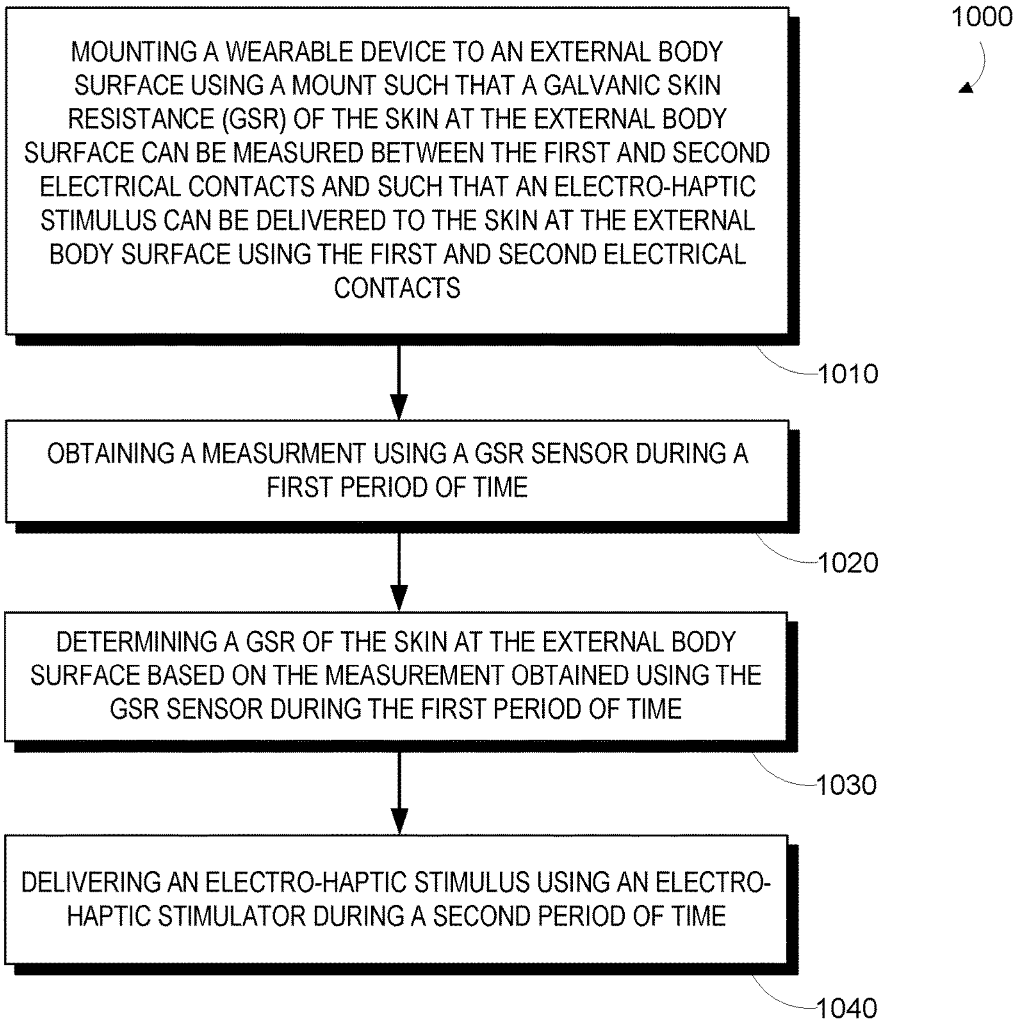
FIG. 10 is a flowchart of an example method.

FIG. 10 is a flowchart of a method 1000 for operating a wearable device. The operated wearable device includes (i) a housing, (ii) a mount configured to mount the housing to an external body surface, (iii) first and second electrical contacts protruding from the housing, (iv) a GSR sensor configured to obtain a measurement relating to a GSR of skin via the first and second electrical contacts, and (v) an electro-haptic stimulator configured to deliver an electro-haptic stimulus to skin via the first and second electrical contacts.

The method 1000 includes mounting the wearable device to an external body surface using the mount such that a Galvanic skin resistance (GSR) of the skin at the external body surface can be measured between the first and second electrical contacts and such that an electro-haptic stimulus can be delivered to the skin at the external body surface using the first and second electrical contacts (1010). In some examples, the wearable device could be configured to be mounted to a wrist of a wearer (e.g., the embodiments illustrated in FIGS. 1, 2A-B, 3A-C, 4A-B, 5, and 6) such that the first and second electrical contacts were in contact with skin of the wrist of the wearer. In some examples, the mount includes an adhesive, and mounting the wearable device to an external body surface (1010) includes activating, applying, and/or exposing the adhesive and adhering the wearable device to the external body surface.

The method 1000 also includes obtaining a measurement using the GSR sensor during a first period of time (1020). For example, the GSR sensor could include a reference voltage source configured to provide a reference voltage relative to the second electrical contact, a resistor having a reference resistance and connected between the reference voltage source and the first electrical contact, and a voltage sensor coupled to the first electrical contact. Obtaining a measurement using the GSR sensor during a first period of time (1020) could include using a processor or other device disposed in the wearable device using operate the voltage sensor to measure the voltage between the first electrical contact and the second electrical contact. The measured voltage could be related to the reference voltage, the reference resistance, and the GSR of the skin at the external body surface. For example, the measured voltage could be a fraction of the reference voltage, wherein the fraction corresponds to the GSR of the skin divided by a sum of the GSR of the skin and the reference resistance The method 1000 also includes determining a Galvanic skin resistance (GSR) of the skin at the external body surface based on the measurement obtained using the GSR sensor during the first period of time (1030). In some examples, a processor or other system disposed in the wearable device could operate a voltage sensor included in the GSR sensor to measure the voltage between the first electrical contact and the second electrical contact. The processor could then execute instructions such that a GSR of the skin was determined based at least on the measured voltage. Determining the GSR of the skin at the external body surface based on the measurement obtained using the GSR sensor during the first period of time (1030) could include determining a multiple of a reference resistance of a resistor. The determined multiple could correspond to the measured voltage divided by a difference, wherein the difference corresponds to the measured voltage subtracted from a reference voltage of a reference voltage source. This determination could be represented by $R_{GSR}=R_{REF}*(V_{SENS}/(V_{REF}-V_{SENS}))$, where $R_{GSR}$ is the determined GSR, $R_{REF}$ is the reference resistance of the resistor, $V_{SENS}$ is the measured voltage, and $V_{REF}$ is reference voltage. Other methods of determining the GSR of the skin based on a voltage measured using the voltage sensor are anticipated.

The method 1000 also includes delivering an electro-haptic stimulus using an electro-haptic stimulator during a second period of time (1040). For example, the electro-haptic stimulator could generate a stimulus pulse having a specified current, voltage, duration, waveform, or some other property. For example, the electro-haptic stimulator could produce an electro-haptic stimulus pulse having a specified voltage between approximately 30 volts and approximately 100 volts. In some examples, the specified property (e.g., voltage) of the electro-haptic stimulus could be related to a determined GSR (e.g., a GSR determined during the first period of time). In some examples, the electro-haptic stimulator could include a boost stimulator. In some examples, delivering an electro-haptic stimulus using an electro-haptic stimulator during a second period of time (1040) could include operating electronic switches or other circuit elements to protect the GSR sensor and/or other elements of the wearable device.

Delivering an electro-haptic stimulus using an electro-haptic stimulator during a second period of time (1040) could include delivering the electro-haptic stimulus in response to an alert or other information and/or generating an electro-haptic stimulus having one or more properties related to an alert or other information. For example, the electro-haptic stimulus could be delivered in response to the wearer receiving a communication (e.g., a text message, email, phone call, or other communications through a smartphone or other device in communication with the wearable device), a change or other property of a health state of the wearer, a pre-specified point in time and/or space being reached, or the generation of some other alert by the wearable device and/or some system in communication with the wearable device. In some examples, an intensity, a frequency, a duration, a pattern (e.g., several pulses and/or trains of pulses of electro-haptic stimulus having specified durations and specified relationships in time), or some other property of delivered electro-haptic stimulus could be specified related to the indicated alert or other information.

The method 1000 for operating a wearable device could include additional steps relating to a determined GSR of the skin at the external body surface. In some examples, the method 1000 could include indicating the determined GSR using a display disposed in the wearable device. In some examples, the method 1000 could include wirelessly indicating the determined GSR using a wireless transmitter disposed in the wearable device. For example, the wearable device could indicate a determined GSR or sequence of determined GSRs to a remote system (e.g., a server or cloud service accessible to a healthcare provider). In some examples, the method 1000 could include operating the wearable device based on the determined GSR. For example, the wearable device could be operated to generate an alert, deliver an electro-haptic stimulus, send a transmission to a remote system, or some other action in response to a determined GSR or sequence of determined GSRs (e.g., if the determined GSR exceeds a threshold). Other applications of a determined GSR are anticipated.

The example method 1000 illustrated in FIG. 10 is meant as an illustrative, non-limiting example. Additional or alternative elements of the method and additional or alternative components of the wearable device are anticipated, as will be obvious to one skilled in the art.

CONCLUSION

Where example embodiments involve information related to a person or a device of a person, the embodiments should be understood to include privacy controls. Such privacy controls include, at least, anonymization of device identifiers, transparency and user controls, including functionality that would enable users to modify or delete information relating to the user's use of a product.

Further, in situations in where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In embodiments where an electro-haptic stimulus or other electrical stimulus is applied to a wearer, safety components and/or software are included to ensure that the wearer is not injured and/or exposed to discomfort due to the delivery of the electro-haptic or other electrical stimulus. Hardware safety components can include circuit breakers, filters, clamping diodes, blocking resistors, blocking capacitors, and/or other components configured to prevent an uncomfortable and/or injurious electrical stimulus from being delivered to the wearer. Software or other instructions governing and/or describing the operation of the wearable device could include instructions prohibiting the application of uncomfortable and/or harmful stimuli, including prohibition of the application of stimuli having harming effects only when applied for protracted periods of time (i.e., having harmful cumulative effects).

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A device comprising:

first and second electrical contacts configured to make electrical contact with a person when the device is coupled to the person;

at least one sensor electronically coupled to the first and second electrical contacts, wherein the at least one sensor is able to obtain a measurement relating to a health state of the person;

a controller configured to specify a plurality of characteristics of an electrical stimulation, wherein each specified characteristic of the electrical stimulation corresponds to a particular health state of the person, and wherein each specified characteristic includes one or more of an intensity, a frequency, a duration, or a pulse pattern of the electrical stimulation; and an electro-haptic stimulator electronically coupled to the first and second electrical contacts, wherein the controller is configured to, based on the health state of the person, cause the electro-haptic stimulator to deliver, to the person through the first and second electrical contacts, the electrical stimulation with one of the specified characteristics, wherein delivering the electrical stimulation elicits an electro-haptic sensation at the person.

2. The device of claim 1, wherein the device is a wearable device comprising a mount for mounting the device to an external body surface of the person.

3. The device of claim 2, wherein the at least one sensor comprises a Galvanic skin resistance (GSR) sensor, and wherein the GSR sensor comprises:

a reference voltage source that provides a reference voltage relative to the second electrical contact;

a resistor connected between the reference voltage source and the first electrical contact, wherein the resistor has a reference resistance; and a voltage sensor coupled to the first electrical contact, wherein the voltage sensor is able to sense a voltage related to the reference voltage, the reference resistance, and a GSR of the person's skin at the external body surface.

4. The device of claim 3, wherein the voltage sensed by the voltage sensor when the device is mounted on the external body surface is a fraction of the reference voltage, and wherein the fraction corresponds to the GSR of the skin divided by a sum of the GSR of the skin and the reference resistance.

5. The device of claim 1, wherein the at least one sensor comprises a Galvanic skin resistance (GSR) sensor, an electrocardiogram (ECG) sensor, a Galvanic skin potential (GSP) sensor, or an electromyogram (EMG) sensor.

6. The device of claim 1, wherein the electro-haptic stimulator comprises a boost converter.

7. The device of claim 1, wherein at least one of the specified characteristics of the electrical stimulation comprises a specified pulse amplitude between 30 volts and 100 volts.

8. The device of claim 1, wherein the first and second electrical contacts are separated by a distance of between 1 millimeter and 50 millimeters.

9. The device of claim 1, wherein the first and second electrical contacts are spring-loaded.

10. The device of claim 1, further comprising a water-proof housing, wherein the first and second electrical contacts protrude from the water-proof housing.

11. A method comprising:

storing, in a memory of a device, a plurality of characteristics of an electrical stimulation, wherein the device comprises first and second electrical contacts configured to make electrical contact with a person when the device is coupled to the person, wherein each characteristic of the electrical stimulation corresponds to a particular health state of the person, and wherein each characteristic of the electrical stimulation includes one or more of an intensity, a frequency, a duration, or a pulse pattern of the electrical stimulation;

obtaining, during a first period of time, a measurement using at least one sensor disposed in the device and electrically coupled to the first and second electrical contacts of the device;

determining a health state of the person based on the measurement obtained using the at least one sensor during the first period of time;

based on the determined health state of the person, selecting one of the stored characteristics of the electrical stimulation; and delivering, during a second period of time, the electrical stimulation with the selected characteristic to the person through the first and second electrical contacts using an electro-haptic stimulator disposed in the device, wherein delivering the electrical stimulation elicits an electro-haptic sensation at the person.

12. The method of claim 11, wherein the device is a wearable device comprising a mount for mounting the device to an external body surface of the person, and wherein the method further comprises mounting the device to the external body surface of the person.

13. The method of claim 11, wherein the at least one sensor comprises a Galvanic skin resistance (GSR) sensor, an electrocardiogram (ECG) sensor, a Galvanic skin potential (GSP) sensor, or an electromyogram (EMG) sensor.

14. The method of claim 11, wherein the at least one sensor comprises a Galvanic skin resistance (GSR) sensor comprising: (i) a reference voltage that provides a reference voltage relative to the second electrical contact, (ii) a resistor having a reference resistance and connected between the reference voltage source and the first electrical contact, and (iii) a voltage sensor coupled to the first electrical contact;

wherein obtaining the measurement comprises measuring a voltage using the voltage sensor and determining a GSR of the person as a multiple of the reference resistance, wherein the multiple corresponds to the measured voltage divided by a difference, and wherein the difference corresponds to the measured voltage subtracted from the reference voltage.

15. The method of claim 14, further comprising indicating the determined GSR using a display disposed in the device.

16. The method of claim 14, further comprising operating the device based on the determined GSR.

17. The method of claim 11, wherein at least one of the characteristics of the electrical stimulation comprises a specified amplitude between 30 volts and 100 volts.

18. A method comprising:

coupling a device to a person so that first and second electrical contacts of the device make electrical contact with the person, wherein the device comprises a memory having stored thereon a plurality of characteristics of an electrical stimulation, wherein each characteristic of the electrical stimulation corresponds to a particular health state of the person, and wherein each characteristic of the electrical stimulation includes one or more of an intensity, a frequency, a duration, or a pulse pattern of the electrical stimulation;

obtaining, during a first period of time, a measurement using at least one sensor disposed in the device and electrically coupled to the first and second electrical contacts of the device;

determining a health state of the person based on the measurement obtained using the at least one sensor during the first period of time;

based on the determined health state of the person, selecting one of the stored characteristics of the electrical stimulation; and delivering, during a second period of time, the electrical stimulation with the selected characteristic to the person through the first and second electrical contacts using an electro-haptic stimulator disposed in the device, wherein delivering the electrical stimulation elicits an electro-haptic sensation at the person.

19. The method of claim 18, wherein the device is a wearable device comprising a mount for mounting the device to an external body surface of the person, and wherein coupling the device to the person comprises mounting the device to the external body surface of the person.

20. The method of claim 19, wherein the at least one sensor comprises a Galvanic skin resistance (GSR) sensor, and wherein obtaining the measurement comprises using the GSR sensor to measure a GSR of the person's skin at the external body surface.

* * * * *